US008651827B2

United States Patent
Usui et al.

(10) Patent No.: US 8,651,827 B2
(45) Date of Patent: Feb. 18, 2014

(54) ELECTROMAGNETICALLY-DRIVEN VALVE MECHANISM AND HIGH-PRESSURE FUEL SUPPLY PUMP USING THE SAME

(75) Inventors: Satoshi Usui, Hitachinaka (JP);
Katsumi Miyazaki, Hitachinaka (JP);
Hiroyuki Yamada, Hitachinaka (JP);
Shingo Tamura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 778 days.

(21) Appl. No.: 12/608,429

(22) Filed: Oct. 29, 2009

(65) Prior Publication Data

US 2010/0111734 A1  May 6, 2010

(30) Foreign Application Priority Data

Oct. 30, 2008  (JP) .................. 2008-279038

(51) Int. Cl.
*F04B 49/22*  (2006.01)

(52) U.S. Cl.
USPC ............................ 417/295; 417/297; 123/455

(58) Field of Classification Search
USPC .......... 417/295, 297, 298; 123/447, 455, 457, 123/495
See application file for complete search history.

(56) References Cited

U.S. PATENT DOCUMENTS

| | | | |
|---|---|---|---|
| 4,646,976 A | 3/1987 | Rembold et al. | |
| 6,022,086 A | 2/2000 | Braum | |
| 6,565,020 B1 | 5/2003 | Fischer et al. | |
| 6,631,706 B1 * | 10/2003 | Yamada et al. | 123/495 |
| 6,688,578 B1 | 2/2004 | Nussio et al. | |
| 2003/0075702 A1 | 4/2003 | Isobe et al. | |
| 2006/0201485 A1 | 9/2006 | Usui et al. | |
| 2007/0137600 A1 * | 6/2007 | Saito | 123/179.1 |

FOREIGN PATENT DOCUMENTS

| | | |
|---|---|---|
| EP | 0 195 261 A2 | 9/1986 |
| EP | 1 701 031 A1 | 9/2006 |
| GB | 2 333 563 A | 7/1999 |
| GB | 2 365 494 A | 2/2002 |
| JP | 61-59974 U | 4/1986 |
| JP | 4-221811 A | 8/1992 |
| JP | 8-105566 A | 4/1996 |
| JP | 10-500923 A | 1/1998 |
| JP | 2000-97361 A | 4/2000 |
| JP | 2000-283314 A | 10/2000 |
| JP | 2003-120846 A | 4/2003 |
| JP | 2003-130246 A | 5/2003 |
| JP | 2006-250086 A | 9/2006 |
| JP | 2007-211857 A | 8/2007 |

OTHER PUBLICATIONS

European Search Report dated Feb. 15, 2010 (Six (6) pages).
Japanese Office Action dated Jan. 18, 2012 (five (5) pages).

* cited by examiner

*Primary Examiner* — Charles Freay
*Assistant Examiner* — Philip Stimpert
(74) *Attorney, Agent, or Firm* — Crowell & Moring LLP

(57) ABSTRACT

A lead line weld joined portion is disposed externally of a magnetic circuit, i.e., of a yoke portion. This allows generation of a sufficient magnetic biasing force between a first core portion and the anchor.

21 Claims, 10 Drawing Sheets

ELECTROMAGNETICALLY-DRIVEN VALVE MECHANISM AND HIGH-PRESSURE FUEL SUPPLY PUMP USING THE SAME

BACKGROUND OF THE INVENTION

1. Field of the Invention

The present invention relates to an electromagnetically-driven valve mechanism whose valve member is driven by an electromagnetic drive mechanism, and a high-pressure fuel supply pump using the same.

2. Description of the Related Art

An electromagnetically-driven valve mechanism described in JP-8-105566-A has a valve member disposed at a fluid inlet port. This valve mechanism includes a movable plunger operated by an electromagnetic force and a spring member biasing the movable plunger toward the side opposite the electromagnetic force. The valve mechanism is configured such that the movable plunger is electromagnetically biased against the spring member to operate the valve member to open and close the fluid inlet port.

SUMMARY OF THE INVENTION

In the conventional configuration, a weld-joined portion between an end of a lead line of an electromagnetic coil and an end of a terminal of a connector formed in a molded resin portion is disposed internally of a closed magnetic circuit, i.e., of a yoke.

This increases the total length of the magnetic circuit, i.e., the length of the yoke by the axial dimension of the lead line weld-joined portion to increase the magnetic resistance of the magnetic circuit. Consequently, the magnetic biasing force occurring between a core portion and the movable plunger decreases.

It is an object of the present invention to provide an electromagnetically-driven valve mechanism that can reduce the length of a closed magnetic circuit to reduce magnetic resistance so that a movable plunger can be operated by a large electromagnetic force, and a high-pressure fuel supply pump using the same.

To achieve the above object, the present invention disposes a lead line weld-joined portion externally of a magnetic circuit, i.e., of a yoke.

Since the lead line weld-joined portion is disposed externally of the magnetic circuit, i.e., of the yoke, there is no need to provide a space adapted to receive the lead line weld-joined portion therein. Thus, the total length of the magnetic circuit can be reduced.

In this way, a sufficient magnetic biasing force can be produced between a core portion and a movable plunger.

DESCRIPTION OF THE PREFERRED EMBODIMENTS

Figure 1:
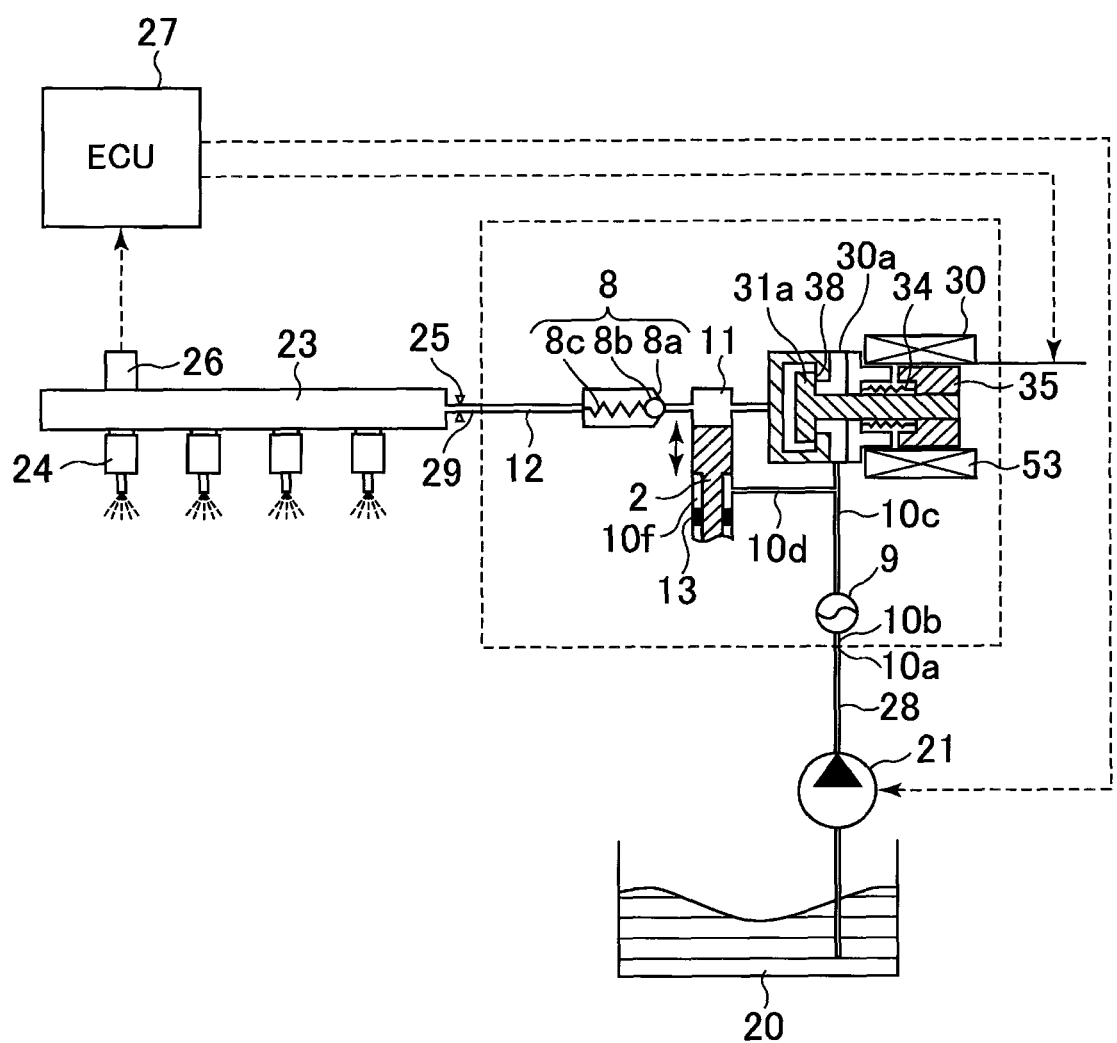
FIG. 1 illustrates a fuel supply system using a high-pressure fuel supply pump according to a first embodiment of the present invention.

The basic configuration of an embodiment according to the present invention is as below. Parenthetic symbols denote respective associated portions but do not always correspond to the terms in the embodiment.

A valve member (31*a*) is disposed at a fluid inlet port (38A). A movable plunger (31*b*, 31*c*, and 35) is operated by an electromagnetic force generated by an electromagnetic drive mechanism (31*b*, 33, 35, 36, and 380) having an electromagnetic coil (53).

A spring member (34) is provided which biases the movable plunger (31*b*, 31*c*, and 35) toward the side opposite the electromagnetic force. The valve member (31*a*) is operated through the movable plunger (31*b*, 31*c*, and 35) against the spring member (34) by electromagnetically biasing the movable plunger (31*b*, 31*c*, and 35), thus opening and closing the fluid inlet port (38).

The electromagnetic drive mechanism (31*b*, 33, 35, 36, and 380) takes the formation of an annular or cylindrical resin-molded body (57 and 380) mounted to the circumference of a core portion (33 and 36) adapted to receive the movable plunger (31*b*, 31*c*, and 35) inserted therethrough.

The electromagnetic drive mechanism (31*b*, 33, 35, 36, and 380) includes an annular or cylindrical electromagnetic coil portion (52 and 53) and a tubular or cylindrical yoke portion (51) surrounding the outside of the electromagnetic coil portion (52 and 53). The electromagnetic coil portion (52 and 53) and the yoke portion (51) are molded by a molding resin as the resin-molded body (57 and 380).

A connection portion (58) for connection with an external device is formed of a molding resin integrally with the resin molded body (57 and 380). One end of a terminal (external connection terminal) (56) formed of a conductor projects into the connector portion (58). A weld joined portion (55) is provided on the outside of the yoke portion so as to be buried in the molding resin. The weld joined portion (55) is electrically connected to a winding-start portion or winding-end portion of a lead line forming the electromagnetic coil (53).

Preferably, the electromagnetic drive mechanism (31b, 33, 35, 36, and 380) is such that the core portion (33 and 36) is mounted in a bottomed cylindrical space defined between the inner circumferential surface of the electromagnetic coil portion (52 and 53) and a portion of the inner circumferential surface of the resin-molded body (57 and 380).

Preferably, a small gap is defined between the outer circumferential surface of the core portion (33 and 36) and the inner circumferential surface of the resin-molded body (57 and 380).

Preferably, the electromagnetic coil portion (52 and 53) is composed of an annular or cylindrical resin bobbin (52) and the electromagnetic coil (53) formed by winding a lead line (54) around the bobbin (52). One end of the external connection terminal (56) is mechanically attached to the axial end of the bobbin (52).

The core portion (33 and 36) is composed of a first core portion (33) made of a magnetic material and a second core portion (36) made of a magnetic material. The second core portion (36) is formed like a cap and provided with an annular groove (36a) on the outer circumference at a particular axial position.

The open end of the second core portion (36) and one end of the first core portion (33) are fixedly fitted to each other by full-circumferential welding (37a).

An anchor (35) is secured to one end of the movable plunger (31b, 31c, and 35). A magnetic gap (Ga) is defined between the respective axial-opposite surfaces of the anchor (35) and of the first core portion (33). The annular groove (36a) is provided on the circumference of the magnetic gap (Ga).

The first core portion (33) is provided with a restricting portion (33B) which restricts the axial displacement of the anchor (35) at a particular position. The spring member (34) is mounted between the anchor (35) and the first core portion (33) to bias the anchor (35) toward the side opposite the restricting member (33B).

During energization, the electromagnetic drive mechanism (31b, 33, 35, 36, and 380) attracts the anchor (35) in a direction opposite that of the biasing force of the spring member (34), i.e., toward the first core portion (33). The valve member (31a) is provided as an externally open valve on the side opposite the anchor (35) of the movable plunger (31b, 31c, and 35). (In the embodiment, the plunger rod portion and the valve member are a metallic single piece subjected to a forming process as described later.)

An auxiliary member (32) composed of a valve seat portion (32a) and a bearing member (32d) is formed as a single piece by machining one and the same metal member. The valve seat portion (32a) comes into abutment against the valve member (31a) to block a fluid passage (38). The bearing member (32d) supports the movable plunger (31b, 31c, and 35) in a reciprocatable manner.

The auxiliary member (32) is fixedly press-fitted into an annular recessed portion of an end, of the first core portion (33), on the side opposite the second core portion (36).

The electromagnetic coil (53) is disposed on the outer circumference of the first core portion (33) and of the second core portion (36). In addition, the yoke portion (51) is disposed on the outer circumference of the electromagnetic coil (53).

The first core portion (33), the magnetic gap (Ga), the anchor (35), the second core portion (36), and the yoke portion (51) form a closed magnetic passage (identical to the closed magnetic circuit) in cooperation with one another.

The spring member (34) is composed of a coil spring, which is attached around the movable plunger (31b, 31c, and 35).

In the state where the anchor (35) is attached, an axial position of the gravity center of the integral type movable plunger (31b, 31c, and 35) and valve member (31a) is located at a position closer to the anchor (35) than to the axial center of the bearing member (32d).

Force other than the electromagnetic force assists the electromagnetic force against the biasing force of the spring member (34). The force other than the electromagnetic force displaces the movable plunger (31b, 31c, and 35) at a given displacement toward the restricting member (33b) and thereafter the electromagnetic force is applied to the movable plunger (31b, 31c, and 35).

The valve member (31a) is initially operatively opened against the force of the spring member (34) due to a difference in fluid pressure between the upstream (the intake passage 32b) and downstream (e.g. a pressurizing chamber 11) of the valve member (31a). Thereafter, the electromagnetic drive mechanism (380) biases the movable plunger (31b, 31c, and 35) in a direction of maintaining or assisting the opening movement of the valve member (31a).

This electromagnetically-driven valve mechanism can be used as an intake valve mechanism (or capacity control valve mechanism) of a high-pressure fuel supply pump. The basic configuration of an embodiment in such a case is as below.

The high-pressure supply pump includes a pressurizing chamber (11) whose capacity is varied by a reciprocating piston plunger (2). The intake valve mechanism (an electromagnetic intake valve mechanism 30) composed of the above-mentioned electromagnetically-driven valve mechanism is disposed at an inlet of the pressurizing chamber (11).

When increasing its capacity, the pressurizing chamber (11) sucks fuel from the intake valve (31a); when reducing the capacity, the pressurizing chamber (11) discharges pressurized fuel from a fuel discharge port (12) through a discharge valve mechanism (8).

When the electromagnetic drive mechanism (380) is de-energized and there is no difference in fluid pressure, the intake valve member (3a) is closed by the spring member (34).

During the intake process of the piston plunger (2) (during downward displacement on the sheet surface in FIGS. 2 and 3), an input voltage is applied to the electromagnetic drive mechanism (380) to operatively open the intake valve member (31a) or to keep it open.

The intake valve member (31a) is operatively opened against the biasing force of the spring member (34) due to the difference in fluid pressure between the side of the intake passage (32b) of the intake valve member 31a and the side of the pressurizing chamber (11). Thereafter, input voltage is applied to the electromagnetic drive mechanism (380) to maintain or assist the opening movement of the intake valve member (31a).

The valve member (31a) is kept open while the input voltage is applied to the electromagnetic drive mechanism (380). Thereafter, the application of the input voltage is stopped during the compression process of the piston plunger (2) to block current flow to the electromagnetic drive mechanism (380). The timing of blocking the current flow by stopping the application of the input voltage to the electromagnetic drive mechanism (380) is controlled in response to the movement of the piston plunger to control an amount of fuel discharged at high pressure.

The value of electric current flowing to the electromagnetic drive mechanism (380) is controlled according to the voltage applied to the electromagnetic drive mechanism (380) to suppress variations in flow rate due to the variations of power supply voltage.

In the duration between the application and stop of input voltage to the electromagnetic drive mechanism (380), the application and stop of input voltage are periodically repeated (the so-called duty control) in further short duration. Thus, waste electric power is reduced in the energization period.

The electromagnetic drive mechanism (380) is unitized as a single piece and such an electromagnetic drive mechanism unit is assembled to a pump body. This improves assemblability.

The details are explained below.

First Embodiment

An embodiment of the present invention is described with reference to FIGS. 1 to 12.

Referring to FIG. 1, a portion surrounded by a broken line indicates a pump housing 1 for a high-pressure pump. Mechanisms and component parts illustrated in the broken line are integrally assembled in the pump housing 1 of the high-pressure pump.

Fuel in a fuel tank 20 is pumped by a feed pump 21 on the basis of a signal from an engine control unit 27 (hereinafter referred to as the ECU), pressurized to an appropriate pressure, and supplied to an intake 10a of a high-pressure fuel supply pump trough an intake pipe 28.

The fuel having passed through the intake 10a passes through an intake filter 102 secured to the inside of an intake joint 101 and reaches an intake port 30a of an electromagnetically-driven valve mechanism 30 constituting a capacity variable mechanism through an intake passage 10b and metal diaphragm dampers 9 and 10c.

The intake filter 102 in the intake joint 101 prevents foreign particles existing between the fuel tank 20 and the intake 10a from entering the inside of the high-pressure fuel supply pump along with the fuel flow.

Figure 4:
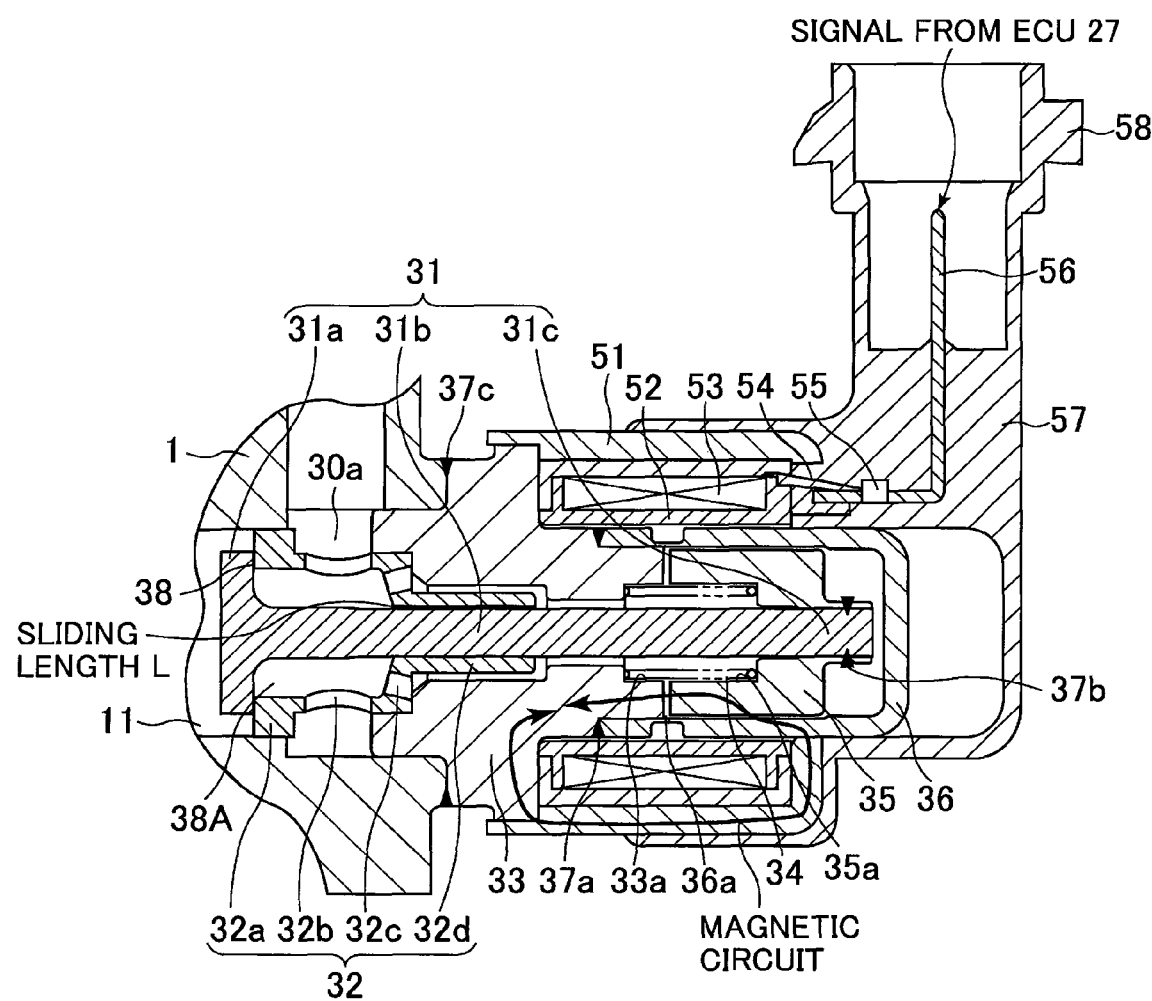
FIG. 4 is an enlarged view of an electromagnetic intake valve mechanism of the high-pressure fuel supply pump according to the first embodiment of the invention, with an electromagnetic coil de-energized.

FIG. 4 is an enlarged view of the electromagnetic intake valve mechanism 30, illustrating a state where an electromagnetic coil 53 is not energized.

Figure 5:
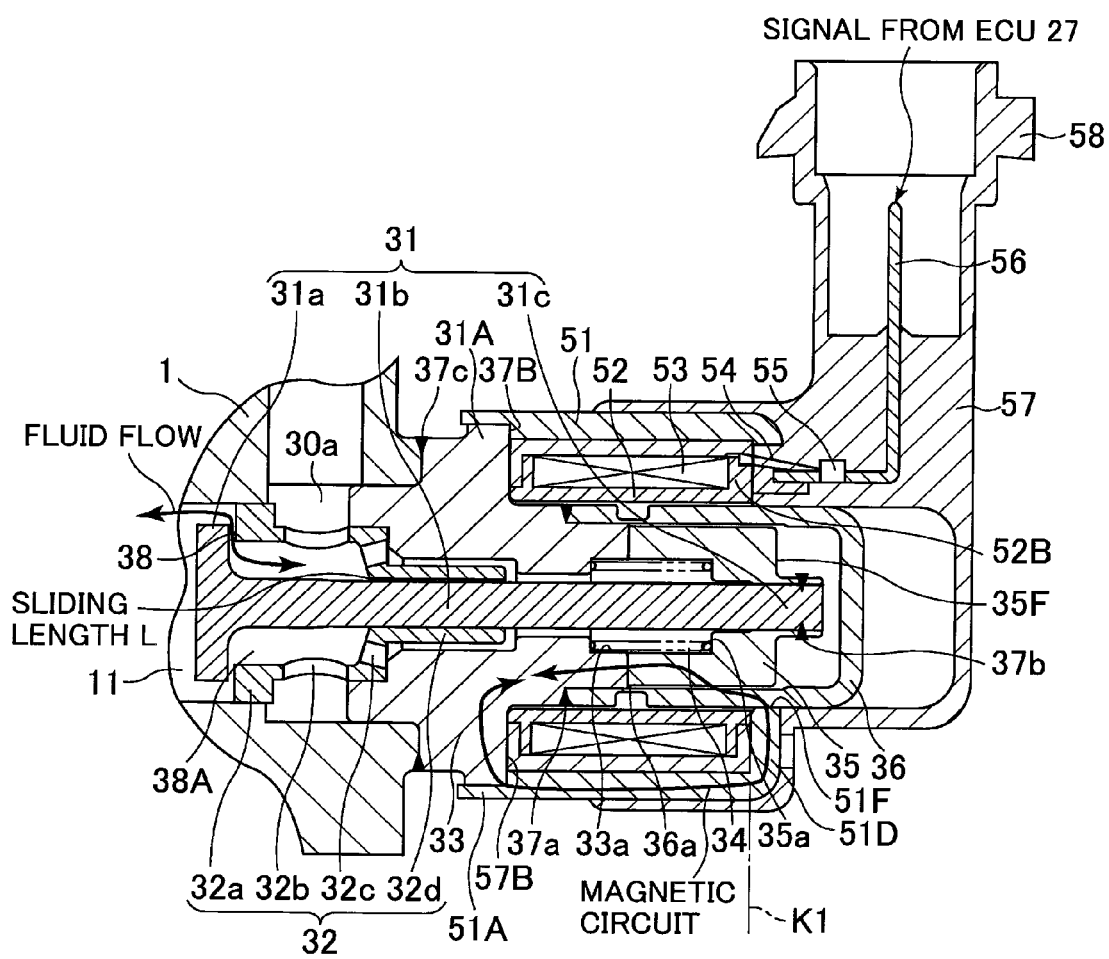
FIG. 5 is an enlarged view of the electromagnetic intake valve mechanism of the high-pressure fuel supply pump according to the first embodiment of the invention, with the electromagnetic coil energized.

FIG. 5 is an enlarged view of the electromagnetic intake valve mechanism 30, illustrating a state where the electromagnetic coil 53 is energized.

The pump housing 1 is centrally formed with a protruding portion 1A serving as a pressurizing chamber 11. In addition, a hole 30A adapted to receive the electromagnetic intake valve mechanism 30 mounted thereinto is formed in the pump housing 1 so as to communicate with the pressurizing chamber 11.

A plunger rod 31 constituting the movable plunger is composed of three portions: an intake valve portion 31a, a rod portion 31b, and an anchor-securing portion 31c. The anchor 35 is fixedly welded to the anchor-securing portion 31c through a weld-joined portion 37b.

As illustrated in the figures, a spring member 34 is fitted into an anchor inner circumference 35a and into a first core portion inner circumference 33a so as to generate a spring force acting in a direction of moving the first core portion 33 and the anchor 35 away from each other.

A valve seat member 32 is composed of a seat portion 32a, an intake passage portion 32b, a press-fitting portion 32c, and a sliding bearing portion 32d. The press-fitting portion 32c is fixedly press fitted into the annular recessed portion of one end of the first core portion 33.

The press-fitting portion 32c is provided with a plurality of small holes 32e. A gap is defined between the outer circumference of the sliding bearing portion 32d and the inner circumference of the first core portion 33 so as to communicate with the intake passage portion 32b through the small holes 32e, allowing for entrance and exit of fluid (fuel).

The seat portion 32a is fixedly press fitted into the pump housing 1 to form a press-fitting portion, which completely isolates the pressurizing chamber 11 and the intake port 30a from each other.

The first core portion 33 is fixedly welded to the pump housing 1 through the weld joined portion 37c to isolate the intake port 30a and the outside of the high-pressure fuel supply pump from each other.

The second core portion 36 is composed of a cap member made of a magnetic material and is fixedly welded at the opening end side to the first core portion 33 through the weld joined portion 37a.

An inner space defined by the first core portion 33 and the second core portion 36 and an outer space is completely isolated from each other. The second core portion 36 is provided on the outer circumferential surface with a magnetic orifice portion 36a composed of an annular groove.

In the state where the electromagnetic coil 53 is not energized, when there is no difference in fluid pressure between the intake passage 10c (the intake port 30a) and the pressurizing chamber 11, the plunger rod 31 is displaced rightward as shown in FIG. 4 by the spring member 34. This state is a valve-closed state where the intake valve portion 31a and the seat portion 32a are brought into contact with each other, closing an intake port 38A.

Figure 2:
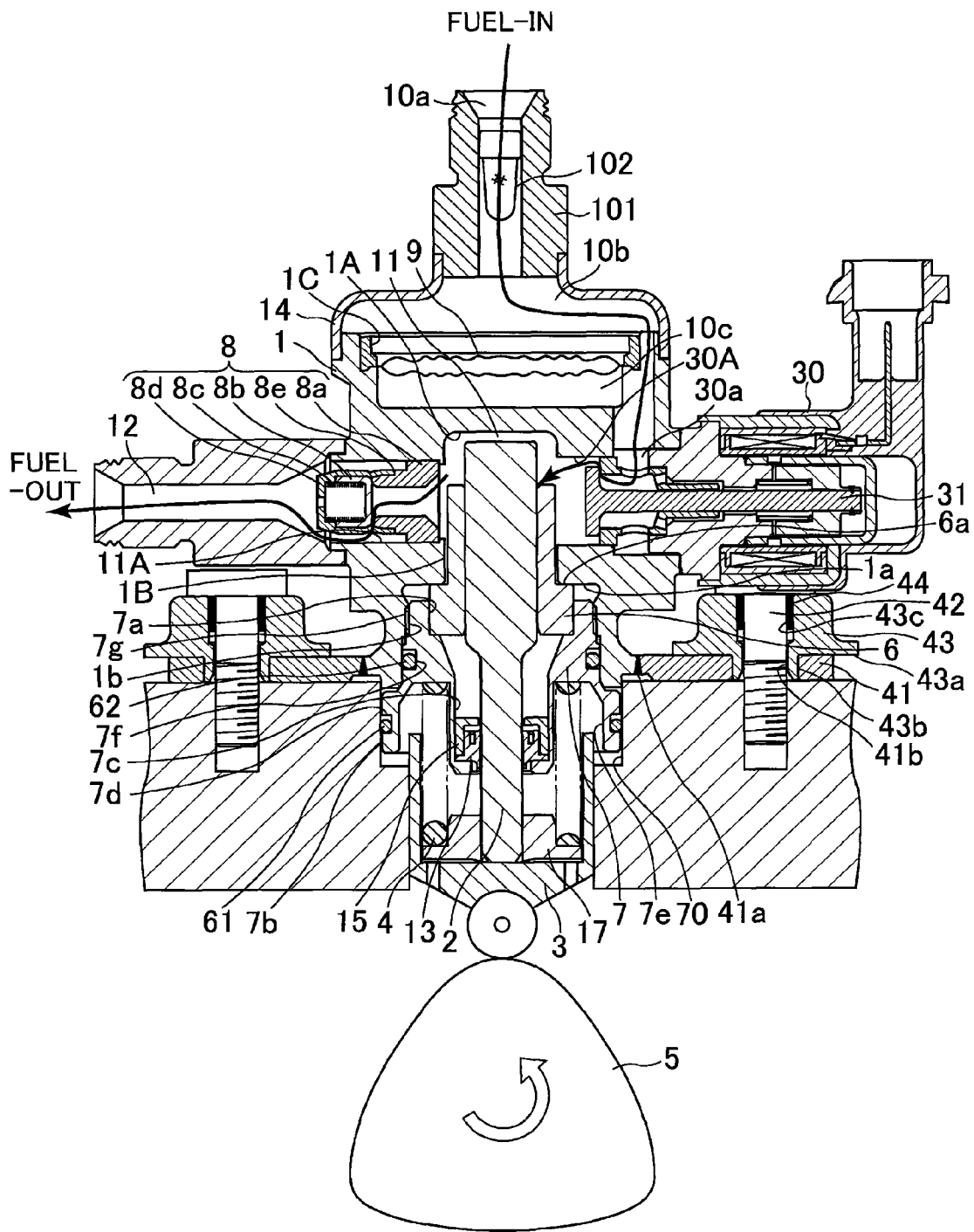
FIG. 2 is a longitudinal cross-sectional view of the high-pressure fuel supply pump according to the first embodiment of the present invention.
Figure 3:
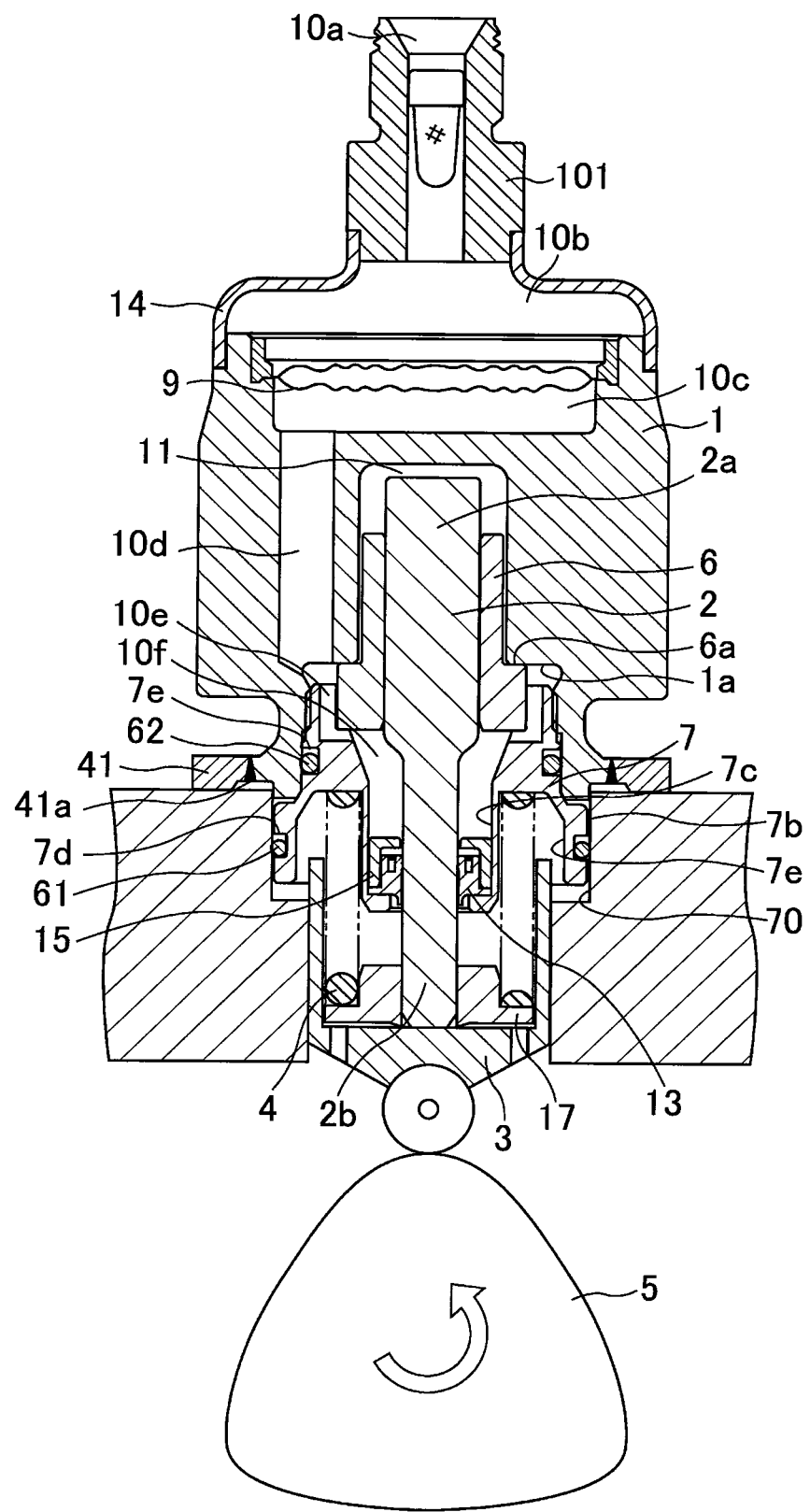
FIG. 3 is a longitudinal cross-sectional view of the high-pressure fuel supply pump according to the first embodiment of the invention, taken along a plane circumferentially shifted by 90 degrees from that in FIG. 2.

Rotation of a cam described later leads to the state of the intake process where the piston plunger 2 is displaced downward in FIG. 2. In this state, the pressurizing chamber 11 is increased in capacity to reduce the fuel pressure therein. In this process, the fuel pressure in the pressurizing chamber 11 becomes lower than the pressure of the intake passage 10c (the intake port 30a). Thus, at the intake valve portion 31a a valve-opening force (force displacing the intake valve portion 31a leftward in FIG. 1) is generated due to the fluid differential pressure of fuel.

The intake valve portion 31a is set such that the valve-opening force due to the fluid differential pressure opens the intake port 38A, overcoming the biasing force of the spring member 34. If the fluid differential pressure is large, the intake valve portion 31a is fully opened and the anchor 35 comes into contact with the first core portion 33. If the fluid differential pressure is small, the intake valve portion 31a is not fully opened and the anchor 35 does not come into contact with the first core portion 33.

In this state, if a control signal from the ECU 27 is applied to the electromagnetic intake valve mechanism 30, an electric current flows in the electromagnetic coil 53 of the electromagnetic intake valve mechanism 30 to generate an attractive magnetic biasing force between the first core portion 33 and the anchor 35. Consequently, the magnetic biasing force is applied to the plunger rod 31 leftward in the figures.

When the intake valve portion 31a is fully opened, its opened state is maintained. On the other hand, when the intake valve portion 31a is not fully opened, the opening movement of the intake valve portion 31a is assisted to fully open the intake valve portion 31a. That is to say, the anchor 35 comes into contact with the first core portion 33. Thereafter, this state is maintained.

Consequently, the intake valve portion 31a is maintained in the state where the intake port 38A is opened. Fuel passes through the intake passage portion 32b of the valve seat member 32 and the intake port 38A from the intake port 30a and flows into the pressurizing chamber 11.

The intake process of the piston plunger 2 is ended while the application of the input voltage to the electromagnetic intake valve mechanism 30 is maintained. The intake process is shifted to the compression process in which the piston plunger 2 is displaced upward in FIG. 2. In the compression process, since the magnetic biasing force remains maintained, the intake valve portion 31a remains opened.

The capacity of the pressurizing chamber 11 is reduced along with the compressive movement of the piston plunger 2. In this state, however, the fuel sucked once into the pressurizing chamber 11 is returned to the intake passage 10c (the intake port 30a) again through the intake port 38A in the opened state. Therefore, the pressure of the pressurizing chamber 11 will not rise. This process is called a return process.

In this state, if the control signal from the ECU 27 is cancelled to de-energize the electromagnetic coil 53, the magnetic biasing force acting on the plunger rod 31 disappears after a given period of time (after a magnetic and mechanical delay time). Since the biasing force of the spring member 34 acts on the intake valve portion 31a, if the electromagnetic force acting on the plunger rod 31 disappears, the intake valve portion 31a closes the intake port 38A through the biasing force of the spring member 34. If the intake port 38A is closed, from this time the fuel pressure of the pressurizing chamber 11 rises along with the upward movement of the piston plunger 2. If the fuel pressure of the pressurizing chamber 11 exceeds the pressure of the discharge port 12, the fuel left in the pressurizing chamber 11 is discharged at high pressure through the discharge valve unit 8 to a common rail 23. This process is called a discharged process. That is to say, the compression process (the elevation process between lower dead center and upper dead center) of the piston plunger 2 consists of the return process and the discharge process.

The amount of high-pressure fuel to be discharged can be controlled by controlling timing when to cancel the energization of the electromagnetic coil 53 of the electromagnetic intake valve mechanism 30.

If the timing to cancel the energization of the electromagnetic coil 53 is advanced, in the compression process, the return process has a small proportion whereas the discharge process has a large one.

In other words, fuel to be returned to the intake passage 10c (the intake port 30a) is in a small amount, whereas fuel to be discharged at high pressure is in a large amount.

On the other hand, if the timing to cancel the input voltage is delayed, in the compression process, the return process has a large proportion whereas the discharge process has a small one. In other words, fuel to be returned to the intake passage 10c is in a large amount, whereas fuel to be discharged at high pressure is in a small amount. The timing to cancel the energization of the electromagnetic coil 53 is controlled by an instruction from the ECU.

With such a configuration, controlling timing to cancel the energization of the electromagnetic coil 53 can control the amount of fuel to be discharged at high pressure to the amount necessary for the internal combustion engine.

The fuel led through the fuel intake port 10a to the pressurizing chamber 11 of the pump housing 1 is highly pressurized in a desired amount by the reciprocation of the piston plunger 2 and then supplied under pressure to the common rail 23 from the discharge port 12.

Injectors 24 and pressure sensors 26 are attached to the common rail 23. The number of the injectors 24 thus attached is made equal to that of cylinders of the internal combustion engine. In response to the control signals of the engine control unit (ECU) 27, the injectors 24 inject fuel into the cylinders while being opened and closed.

In this case, along with the upward and downward movement of the piston plunger 2, the intake valve portion 31a repeats the opening and closing operation of the intake port 38A and the plunger rod 31 repeats leftward and rightward movement in the figures. The movement of the plunger rod 31 is limited only to the leftward and rightward movements in FIGS. 4 to 6 by the sliding bearing portion 32d of the valve seat member 32. The sliding bearing portion 32d and the rod portion 31b repeat sliding movement therebetween. Therefore, the sliding portion needs sufficiently low surface roughness so as not to act as resistance against the sliding movement of the plunger rod 31. The clearance of the sliding portion is selected as below.

If the clearance is too large, the plunger rod 31 may swing around the sliding portion like a pendulum, whereby the anchor 35 and the second core portion 36 come into contact with each other. If the plunger rod 31 slidably moves, the anchor 35 and the second core portion 36 may slide with each other, which increases resistance resulting from the sliding movement of the plunger rod 31. Thus, the responsiveness of the opening and closing movement for the intake port 38A becomes poor. Since the anchor 35 and the second core portion 36 are made of ferritic magnetic stainless steel, if they slide with each other, it is probable that wear powder and the like may be produced. As described later, the smaller the gap between the anchor 35 and the second core portion 36, the larger the magnetic biasing force. If the gap is too large, the magnetic biasing force is insufficient, which makes it impossible to appropriately control the amount of fuel to be discharged at high pressure. In view of such circumstances, it is necessary to make the gap between the anchor 35 and the second core portion 36 as small as possible and to prevent them from coming into contact with each other.

To meet the necessity, the sliding portion is made single and further a sliding length L of the sliding bearing portion 32d is made sufficiently long as shown in FIGS. 4 and 5. The sliding portion is formed of the inner diameter of the sliding bearing portion 32d and the outer diameter of the rod portion 31b. Machining any of them inevitably needs tolerance and the clearance of the sliding portion also needs tolerance. On the other hand, the clearance between the anchor 35 and the second core portion 36 has an upper limit because of the magnetic biasing force as described above. To accommodate the tolerance of the clearance and to prevent the anchor 35 and the second core portion 36 from coming into contact with each other, it is needed only to make the sliding length L longer, thereby reducing the pendulum motion.

In this way, when the plunger rod 31 is about to move like a pendulum, the sliding bearing portion 32d and the rod portion 31b come into contact and slide with each other at both ends of the sliding portion. Therefore, the clearance between the anchor 35 and the second core portion 36 can be made small.

If the clearance is too small, during the closed state of the intake port 38A, the intake valve portion 31a and the seat portion 32a will not come into full surface contact with each other. This is because the clearance of the sliding portion cannot accommodate the perpendicularity of the intake valve portion 31a and rod portion 31b of the plunger rod 31 and that of the seat portion 32a and sliding bearing portion 32d of the valve seat member 32. Unless the intake valve portion 31a and the seat portion 32a come into full surface contact with each other, it is probable that the plunger rod 31 may undergo excessive torque to be broken because of high-pressure fuel in the pressurizing chamber 11 having high pressure during the discharge process. In addition, it is probable that the sliding portion may undergo an excessive load to be broken or worn.

In view of such circumstances, it is necessary for the intake valve portion 31a and the seat portion 32a to come into full surface contact with each other in the closed state of the intake port 38A. In particular, if the increased sliding length L intends to suppress the pendulum motion of the plunger rod 31 as described above, accuracy is increased that is desired by the perpendicularity of the intake valve portion 31a and rod portion 31b of the plunger rod 31 and that of the seat portion 32a and sliding bearing portion 32d of the valve seat member 32.

For this reason, the seat portion 32a and the sliding bearing portion 32d are provided on the valve seat member 32. The seat portion 32a and the sliding bearing portion 32d are made of one and the same member so as to have the accurate perpendicularity. If the seat member 32a and the sliding bearing portion 32d are made of separate members, then the causes of poor perpendicularity occur at machined and joined portions. However, this problem can be solved by the seat portion 32a and the sliding bearing portion 32d being made of a single member.

If the magnetic biasing force generated by the energization of the electromagnetic coil 53 is insufficient, the amount of fuel discharged at high pressure cannot be appropriately controlled. Therefore, the magnetic circuit formed around the electromagnetic coil 53 should be one that can generate a sufficient magnetic biasing force.

In other words, a magnetic circuit is desired in which much more magnetic flux flows when the electromagnetic coil 53 is energized to produce a magnetic field therearound. In general, as the magnetic circuit is thicker and shorter, magnetic resistance is smaller. Therefore, magnetic flux passing through the magnetic circuit increases to increase a magnetic biasing force to be generated.

In the present embodiment, as shown in FIG. 5, members constituting the magnetic circuit are the anchor 35, the first core portion 33, the yoke portion 51, and the second core portion 36, all of which are made of magnetic materials.

The first core portion 33 and the second core portion 36 are joined together by welding at the weld joined portion 37a. The magnetic flux does not directly pass between the first core portion 33 and the second core portion 36; it needs to pass therebetween through the anchor 35. This intends to produce the magnetic biasing force between the first core portion 33 and the anchor 35. If the magnetic flux directly passes between the first core portion 33 and the second core portion 36 so that magnetic flux passing through the anchor 35 reduces, the magnetic biasing force decreases.

To solve such a problem, a conventional configuration is such that an intermediate member is provided between the first core portion 33 and the second core portion 36. Since the intermediate member is a non-magnetic body, the magnetic flux will not directly pass between the first core portion 33 and the second core portion 36 but all the magnetic flux passes through the anchor 35.

However, the provision of the intermediate member increases the number of component parts and it is necessary to join the intermediate member to the first core portion 33 and to the second core portion 36, which leads to a problem of increased cost.

To solve the problem, in the present embodiment, the first core portion 33 and the second core portion 36 are directly joined together at the weld joined portion 37a to form a magnetic orifice portion 36a as the annular groove 36a provided on the outer circumference of the second core portion. The magnetic orifice portion 36a functions as magnetic resistance in a closed magnetic path. The magnetic orifice portion 36a is reduced in thickness as much as possible so far as the thickness permits. On the other hand, the other portions of the second core portion 36 ensure a sufficient thickness. The magnetic orifice portion 36a is disposed close to a portion where the first core portion 33 and the anchor 35 come into contact with each other.

In this way, most of the magnetic flux produced passes through the anchor 35 but the magnetic flux directly passing between the first core portion 33 and the second core portion 36 is in an extremely small amount. Because of this, the lowering of the magnetic biasing force produced between the first core portion 33 and the anchor 35 is brought into an acceptable range.

While the first core portion 33 and the anchor 35 are in contact with each other, the largest gap in the magnetic circuit is a radial gap formed between the inner circumferential surface of the second core portion 36 and the outer circumferential surface of the anchor 35. Since the radial gap is filled with fuel, the larger the gap, the greater the magnetic resistance of the magnetic circuit. Thus, as the gap is smaller, the magnetic circuit is better.

In the present embodiment, the radial gap between the second core portion 36 and the anchor 35 can be made small by increasing the sliding length L of the sliding portion as described earlier.

The magnetic coil 53 is formed by winding a lead line 54 around an annular or cylindrical resin bobbin 52 centered at the axis of the plunger rod 31. Both end portions (a winding-start portion and a winding-end portion) of the lead line 54 are connected to respective different terminals 56 by welding through respective lead line weld joined portions. The terminal 56 is formed of a conductive metal plate, one end of which is attached to one end of the resin bobbin 52 and the other end of which projects toward a connector portion 58.

The connector portion 58 is connected to a counterpart connector associated with the ECU for contact with a counterpart terminal, whereby the coil can be energized.

The electromagnetic coil 53 is housed in the cup-like yoke portion 51 and thereafter a molding resin is internally and externally injected to the yoke portion 51, thereby forming the resin molded body 57. The lead line weld joined portion 55 and the electromagnetic coil 53 except a portion of an open end side inner and outer circumferences of the yoke portion 51, the inner circumferential surface of the bobbin 52 and a portion of the terminal 56 are buried into the resin. Thus, the connector portion 58 is formed around the protruding portion of the terminal. In this case, the inner circumferential surface of the resin bobbin 52 is formed to have a diameter L1 greater than a diameter L2 of the inner circumferential surface of the resin molded body 57.

The outer circumferential portion of the second core portion 36 of an intake valve unit 370 is inserted into the inner circumferential portion of the resin molded body 57 so as to keep a minute gap therebetween. Consequently, even if the resin molded body 57 has a molding tolerance, the outer circumference of the second core portion 36 will not rub the inner circumferential surface of the resin molded body 57. Thus, the resin molded body 57 will not undergo an excessive force to cause no cracks.

Figure 6:
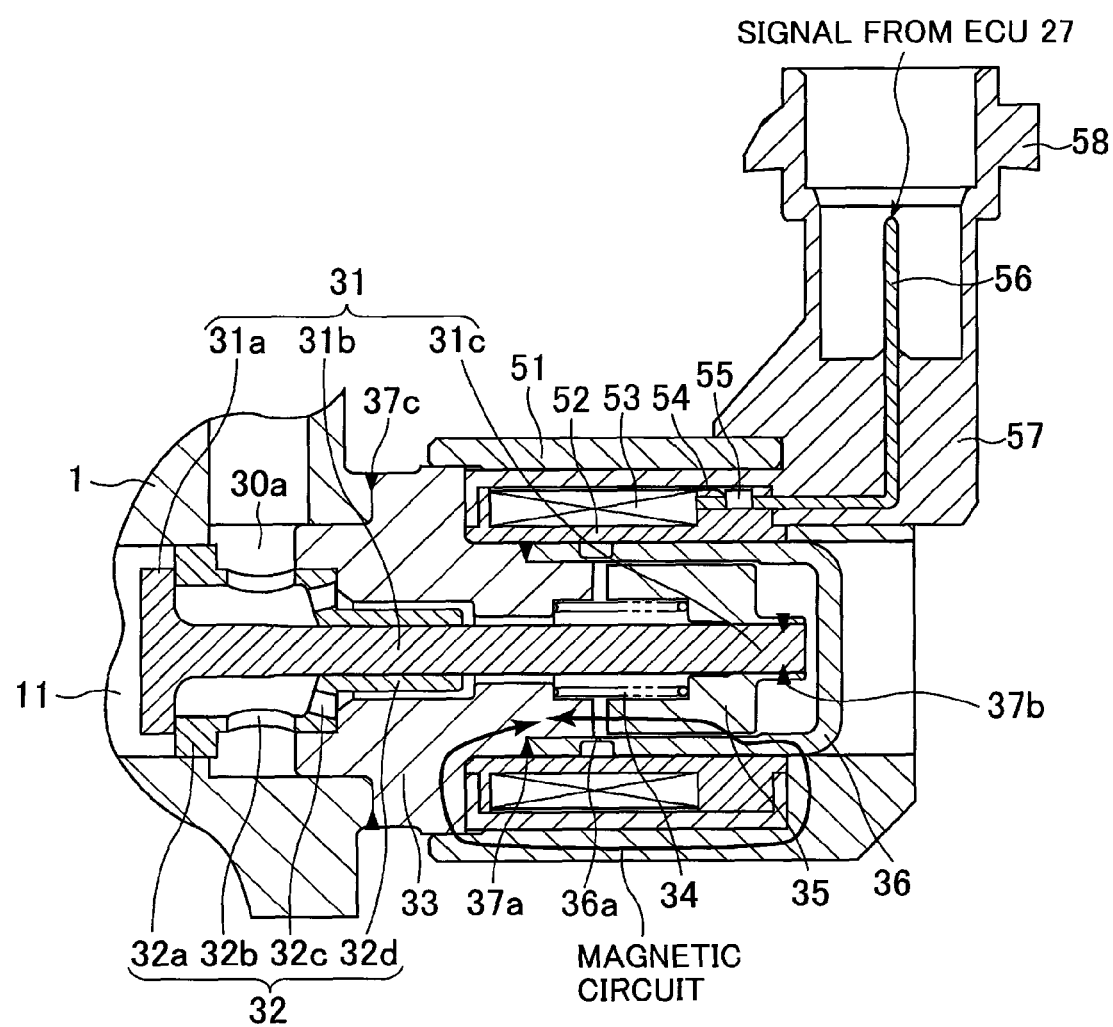
FIG. 6 is an enlarged view of an electromagnetic intake valve mechanism of the high-pressure fuel supply pump according to a conventional example, with an electromagnetic coil de-energized.

FIG. 6 illustrates a conventional structure of an electromagnetic intake valve mechanism. In the conventional structure, the lead line weld joined portion 55 between the lead line and the terminal end is disposed internally of the magnetic circuit, i.e., of the yoke portion 51. Therefore, the total length of the magnetic circuit, i.e., the length of the yoke portion 51 is increased by the axial dimension of the lead line weld joined portion 55. This will increase the magnetic resistance of the magnetic circuit, which leads to a problem with a reduced magnetic biasing force occurring between the first core portion 33 and the anchor 35.

In the present embodiment, the lead line weld joined portion 55 is disposed externally of the magnetic circuit, i.e., of the yoke portion 51. In this way, since there is no need for a space adapted to receive the lead line weld joined portion 55 therein, the total length of the magnetic circuit can be reduced. This can generate a sufficient magnetic biasing force between the first core portion 33 and the anchor 35.

Figure 7:
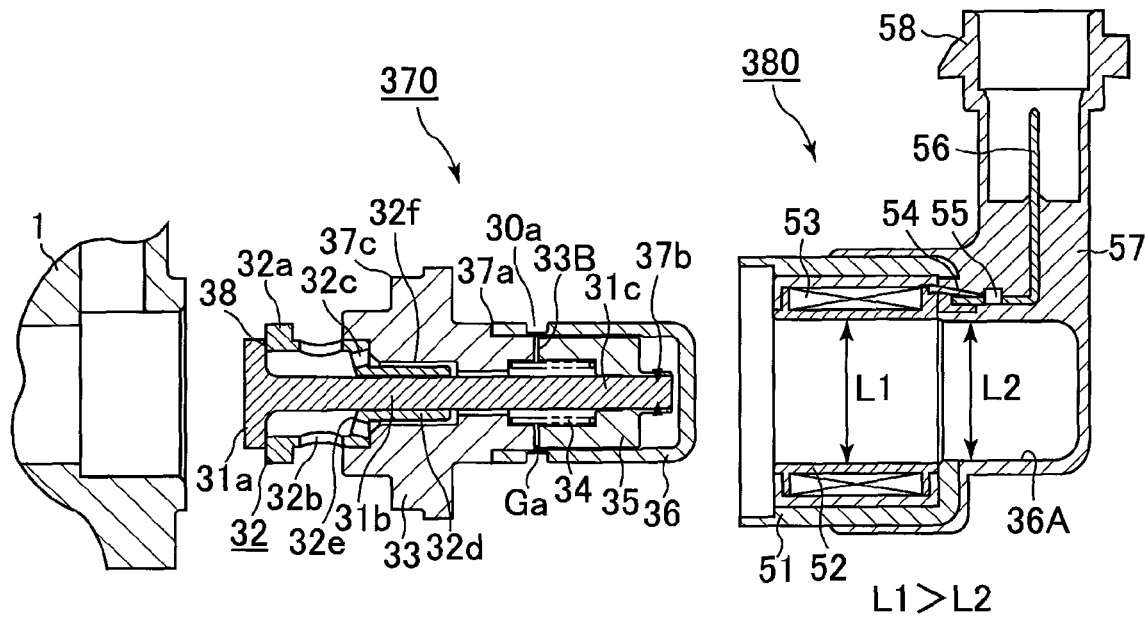
FIG. 7 illustrates a state before the electromagnetic intake valve mechanism of the high-pressure fuel supply pump according to the first embodiment of the invention is assembled into a pump housing.

FIG. 7 illustrates a state before the electromagnetic intake valve mechanism 30 is assembled into the pump housing 1.

In the present embodiment, first, the intake valve unit 370 and the connector unit 380 are each unitized. The connector unit 380 is called a connector unit because of having the connector 58, also called the resin molded body 57 because of being molded of resin, and further called the electromagnetic drive mechanism 380 because of having the function of an electromagnetic drive mechanism. Next, the seat portion 32a of the intake valve unit 370 is fixedly press-fitted into the pump housing 1 and thereafter the weld joined portion 37c is full-circumferentially joined by welding. In the present embodiment, the welding is laser welding. In this state, the inner circumferential surface of the thinned-wall portion 51A disposed at the opening end of the yoke portion 51 of the connector unit 380 is fixedly press-fitted into the outer circumference of an annular projecting surface 31A of the first core portion 33.

With such a configuration, since the connector unit 380 can be press-fitted into the first core portion 33 at any position of 360 degrees, the orientation of the connector 58 can freely be selected.

Further in the present embodiment, to prevent the outer circumferential surface of the second core portion 36 from coming into contact with any one of the inner circumferential surface of the bobbin 52, the inner circumferential surface of the yoke portion 51, and the inner circumferential surface of the resin molded body 57, an appropriate gap is defined therebetween. It is desirable that such a gap be designed to have such a size as to prevent the contact even if the connector unit 380 oscillates in sympathetic vibration with the engine. In addition, the gap prevents the outer circumference of the second core portion 36 from coming into pressure fit with the inner circumferential surface of the connector unit 380 during the assembly of the connector unit 380 to the valve seat unit 370. In short, the gap is adapted to prevent the connector unit from being broken by an excessive force that would otherwise undergo during the assembly.

However, it is advantageous to reduce the magnetic resistance of the magnetic path that the gap is as small as possible which is located at a portion between the outer circumferential surface of the second core portion 36 and an inner circumferential surface 51F of the hole provided on the bottom wall 51D of the cup-like yoke portion 51 to receive the second core portion 36 inserted thereinto.

In order to make it easy for the second core portion 36 to be inserted into the connector unit 380, it is preferable that the gap associated with the resin bobbin 52 be somewhat large.

Accordingly, the gaps are set in view of such conditions. Specifically, the gap associated with the resin bobbin 52 has the largest size (L1). The gap associated with the bottom wall 51D of the cup-like yoke portion 51 has the smallest size (L2). The gap associated with the resin molded portion has the same size as that associated with the bottom wall 51D of the cup-like yoke portion 51 or has the size slightly larger than that L1 associated with the resin bobbin 52.

In the present embodiment, the lead line weld joined portion 55 electrically connected with the winding-start portion or winding-end portion of the lead line 54 forming the electromagnetic coil 53 is disposed externally of the yoke portion 51. The thickness of the bottom wall 51D of the cup-like yoke portion 51 is reduced accordingly. Consequently, the bottom wall 51D of the cup-like yoke portion 51 is reduced in thickness to reduce an area (flux-passing area) opposite the second core portion 36 in its thickness-direction. To compensate for the reduced area in the embodiment, a flange portion 52B of the resin bobbin 52 on the side opposite the first core portion 31 is reduced in thickness. With such a configuration, an end face 35F of the anchor 35 on the side opposite the first core portion 31 passes the end face K1, close to the bobbin, of the bottom wall 51D of the cup-like yoke portion 51 so as to overlap the bottom wall 51D in its thickness direction.

Further, the cap-like portion of the second core portion 36 is configured to pass through the hole provided in the bottom wall 51D of the cup-like yoke portion 51 so as to project outwardly of the bottom wall 51D of the cup-like yoke portion 51.

In this way, the magnetic flux passing through the bottom wall 51D of the cup-like yoke portion 51 passes through the small gap and is led to the anchor 35 via the second core portion 36.

According to this configuration, (1) the inner circumferential surface 51F of the hole of the bottom wall 51D included in the cup-like yoke portion 51 faces the outer circumferential surface of the second core portion 36 via the small gap; therefore, magnetic resistance can be reduced.

(2) The distance between the end face 35F of the anchor 35 and the inner circumferential surface 51F of the hole of the bottom wall 51D included in the cup-like yoke portion 51 can be reduced; therefore, magnetic resistance can be reduced.

Thus, the overall magnetic path can be shortened and the magnetic resistance can be reduced.

The pump housing 1 is centrally formed with the protruding portion 1A as the pressurizing chamber 11. A recessed portion 11A is formed to pass through the circumferential wall of the pressurizing chamber 11 so as to receive the discharge valve unit 8 mounted therein.

The discharge valve unit 8 is disposed at the outlet of the pressurizing chamber 11. The discharge valve unit 8 includes a seat member 8a, a discharge valve 8b, a discharge valve spring 8c, and a holding member 8d as a discharge valve stopper. On the outside of the pump housing 1, a weld portion 8e is welded to assemble the discharge valve unit 8. Thereafter, the discharge valve unit 8 assembled from the left side in FIG. 2 is fixedly press-fitted into the pump housing 1. A press-fitting portion also has a function of isolating the pressurizing chamber 11 from the discharge port 12.

When there is no difference in the fuel pressure between the pressurizing chamber 11 and the discharge port 12, the discharge valve 8b is brought into pressure fit with the seat member 8a by the biasing force of the discharge valve spring 8c, leading to the closed state. When the fuel pressure in the pressurizing chamber 11 becomes higher than that of the discharge port 12 by a given value, the discharge valve 8b is first opened against the discharge valve spring 8c so that the fuel in the pressurizing chamber 11 is discharged toward the common rail 23 through the discharge port 12.

When opened, the discharge valve 8b comes into contact with the holding member 8d to be limited in movement. Therefore, the stroke of the discharge valve 8b is appropriately determined by the holding member 8d. If the stroke is too great, the closing-delay of the discharge valve 8b allows the fuel discharged to the fuel discharge port 12 to flow back again into the pressurizing chamber 11. This lowers efficiency as a high-pressure pump. While the discharge valve 8b repeats opening and closing movements, the discharge valve 8b is guided by the holding member 8d to move only in the direction of stroke. With the configuration as described above, the discharge valve unit 8 serves as a check valve which limits the flowing direction of fuel.

The cylinder 6 is held at the outer circumference by a cylindrical fitting portion 7a of a cylinder holder 7. The cylinder 6 is secured to the pump housing 1 by screwing a screw 7g threaded on the outer circumference of the cylinder holder 7 into a thread 1b made on the pump housing 1.

A plunger seal 13 is held at the lower end of the cylinder holder 7 by a seal holder 15 and the cylinder holder 7, the seal holder 15 being fixedly press-fitted to an inner circumferential cylindrical surface 7c of the cylinder holder 7. In this case, the plunger seal 13 is held by the inner circumferential cylindrical surface 7c of the cylinder holder 7 coaxially with the cylindrical fitting portion 7a. The piston plunger 2 and the plunger seal 13 are installed in slidable contact with each other at the lower end of the cylinder 6 in the figures.

This prevents the fuel in a seal chamber 10 from flowing toward a tappet 3, i.e., into the inside of the engine. Concurrently, this prevents lubricating oil (including engine oil) lubricating the sliding portions in an engine room from flowing into the inside of the pump body 1.

The cylinder holder 7 is provided on an outer circumferential cylindrical surface 7b with a groove 7d adapted to receive an O-ring 61 fitted thereinto. The O-ring 61 is such that the inner wall of a fitting hole 70 on the engine side and the groove 7d of the cylinder holder 7 isolate the cam side of the engine from the outside, thereby preventing engine oil from leaking outward.

The cylinder 6 has a pressure fit portion 6a intersecting the reciprocating direction of the piston plunger 2. The pressure fit portion 6a is in pressure fit with a pressure fit surface 1a of the pump housing 1. The pressure fit is executed by a thrust force resulting from screw-fastening. The pressurizing chamber 11 is formed by the pressure fit mentioned above. Screw-fastening torque must be controlled so that even if being highly pressurized, the fuel in the pressurizing chamber 11 will never leak from there through the pressure fit portion to the outside.

To keep the sliding length between the piston plunger 2 and the cylinder 6 appropriate, the cylinder 6 is deeply inserted into the pressurizing chamber 11. On the side of the pressurizing chamber 11 with respect to the pressure fit portion 6a of the cylinder 6, a clearance 1B is provided between the outer circumference of the cylinder 6 and the inner circumference of the pump housing 1. The cylinder 6 is held at the outer circumference by the cylindrical fitting portion 7a of the cylinder holder 7. Therefore, the provision of the clearance 1B can eliminate the contact between the outer circumference of the cylinder 6 and the inner circumference of the pump housing 1.

In the manner as described above, the cylinder 6 can hold the piston plunger 2 advancing and retreating in the pressurizing chamber 11 slidably in the advancing and retreating direction.

The tappet 3 is provided at the lower end of the piston plunger 2. The tappet 3 is adapted to convert the rotation movement of a cam 5 attached to a camshaft of the engine into up-and-down movement and transmit it to the piston plunger 2. The piston plunger 2 is press fitted to the tappet 3 via a retainer 15 by means of a spring 4. The retainer 15 is fixedly press fitted to the piston plunger 2. In this way, the piston plunger 2 can be advanced and retreated (reciprocated) up and down along with the rotation movement of the cam 5.

The piston plunger 2 repeats the reciprocating movement inside the cylinder 6. In this case, if the inner circumference of the cylinder 6 is deformed, the piston plunger 2 and the cylinder 6 may seize and fix with each other. If so, the piston plunger 2 cannot perform the reciprocating movement so that it cannot discharge fuel at high pressure.

It is conceivable that one of the causes of the fixation may be deformation of the inner circumferential portion (sliding portion) of the cylinder 6. The concentric degree between the outer circumferential cylindrical surface 7b and the cylindrical fitting portion 7a may be very low. In such a case, the inner wall of the fitting hole 70 on the engine side and the outer circumferential cylindrical surface 7b come into contact with each other. Thus, the installation of the pump will cause a minute deformation of the cylinder 6.

To solve such a problem, the outer circumferential cylindrical surface 7b and the cylindrical fitting portion 7a are provided on the cylinder holder 7. If the outer circumferential cylindrical surface 7b and the cylindrical fitting portion 7a are provided on respective separate members, causes of degrading the concentric degree will inevitably occur at machined and joined portions. However, the outer circumferential cylindrical surface 7b and the cylindrical fitting portion 7a are provided on one and the same member, so that such a problem can be solved.

In the present embodiment, the cylinder 6 is formed to project toward the pressurizing chamber 11 from the pressure fit portion 6a thereof. In addition, the clearance 1B is defined between the outer circumference of the cylinder 6 and the inner circumference of the pump housing 1. The pressure fit surface between the cylinder 6 and the pump housing 1 extends in a direction intersecting the direction of the reciprocating movement of the piston plunger 2 and is disposed externally of the clearance 1b.

The cylinder 6 and the pump housing 1 are configured such that even if they are brought into pressure fit with each other, it is hard for the deformation of the pressure fit portion to be transmitted to the inner circumference of the cylinder 6. In this way, while the deformation of the inner circumference of the cylinder 6 is minimized, the sliding length between the cylinder 6 and the piston plunger 2 can be made long.

The other causes of the fixation include the inclination of the piston plunger 2. This may probably occur if the concentric degree between the axis of the sliding portion between the cylinder 6 and the piston plunger 2 and the axis of the sliding portion between the plunger seal 13 and the piston plunger 2 is low.

To solve such a problem, the cylindrical fitting portion 7a and the inner circumferential cylindrical surface 7c are provided on the cylinder holder 7. If the cylindrical fitting portion 7a and the inner circumferential surface 7c are provided on respective separate members, causes of degrading the concentric degree will inevitably occur at machined and joined portions. However, the cylindrical fitting portion 7a and the inner circumferential cylindrical surface 7c are provided on one and the same member, so that such a problem can be solved.

For the reason described above, the cylindrical fitting portion 7a, the outer circumferential cylindrical surface 7b and the inner circumferential cylindrical surface 7c are all configured to be provided on the cylinder holder 7. This configuration can concurrently solve the problem of the concentric degree between the outer circumferential cylindrical surface 7b and the cylindrical fitting portion 7a and between the cylindrical fitting portion 7a and the inner circumferential cylindrical surface 7c. Further, as a result, the deformation of the inner circumferential portion (the sliding portion) of the cylinder 6 and the inclination of the piston plunger can concurrently be solved.

The intake passage 10c is connected to a seal chamber 10f through an intake passage 10d and through an intake passage 10e provided in the cylinder holder 7. The seal chamber 10f constantly undergoes the pressure of intake fuel. When the fuel in the pressurizing chamber 11 is highly pressurized, a small amount of high-pressure fuel flows into the seal chamber 10f through the clearance between the cylinder 6 and the piston plunger 2. However, since the high-pressure fuel that has flowed thereinto is released into intake pressure, breakage of the plunger seal 13 that would otherwise be caused by high pressure will not occur.

The piston plunger 2 is composed of a large-diameter portion 2a sliding along the cylinder 6 and a small-diameter portion 2b sliding along the plunger seal 13. The large-diameter portion 2a has a diameter greater than that of the small-diameter portion 2b. In addition, the large-diameter portion 2a and the small-diameter portion 2b are designed coaxially with each other. The sliding portion with the cylinder 6 is the large-diameter portion 2a and the sliding portion with the plunger seal 13 is the small-diameter portion 2b. Since a joint portion between the large-diameter portion 2a and the small-diameter portion 2b is located in the seal chamber 10f, the capacity of the seal chamber 10f is varied along with the sliding movement of the piston plunger 2. Along with the variations, fuel is moved between the seal chamber 10f and the intake passage 10c through the intake passages 10d and 10e.

Since the piston plunger 2 repeatedly slides along the plunger seal 13 and the cylinder 6, it generates friction heat. Because of the friction heat, the large-diameter portion 2a of the piston plunger 2 is thermally expanded. A portion of the large-diameter portion 2a closer to the plunger seal 13 is closer to a heat-generating source than another portion of the large-diameter portion 2a closer to the pressurizing chamber 11. Therefore, the thermal expansion of the large-diameter portion 2a will not be uniform and consequently the large-diameter portion 2a lowers in cylindrical degree. Thus, the plunger 2 and the cylinder 6 will seize and fix with each other.

In the present embodiment, the sliding movement of the piston plunger 2 constantly changes the fuel in the seal chamber 10f. This fuel has an effect of removing the heat generated. This effect can prevent the deformation of the large-diameter portion 2a due otherwise to the friction heat so as to prevent the seizure and fixation between the piston plunger 2 and the cylinder 6 that occur due otherwise to the deformation.

Further, as the diameter of the sliding portion with the plunger seal 13 is smaller, the friction area is more reduced. Therefore, also the friction heat generated by the sliding movement is reduced. In the present embodiment, it is the small-diameter portion 2b of the piston plunger 2 that slides along the plunger seal 13. Therefore, the amount of heat generated by the friction with the plunger seal 13 can be suppressed to a low level to prevent the seizure and fixation.

Figure 8:
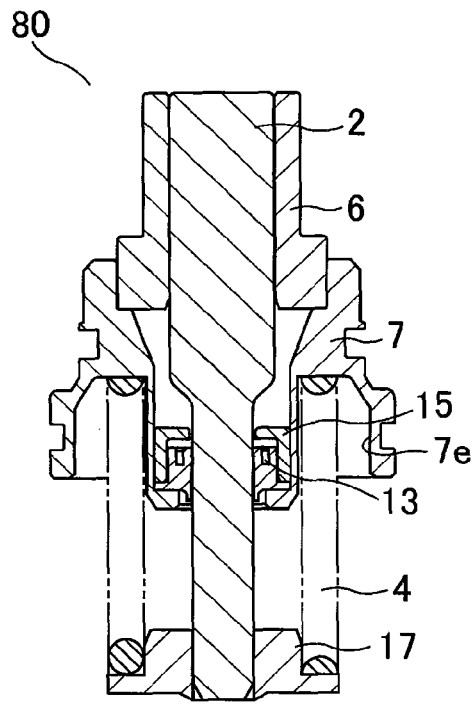
FIG. 8 illustrates a state before a piston plunger unit of the high-pressure fuel supply pump according to the first embodiment of the invention is assembled into the pump housing.

FIG. 8 illustrates a state before the cylinder holder 7 is secured to the pump housing 1 by means of screws.

The piston plunger 2, cylinder 6, seal holder 15, plunger seal 13, cylinder holder 7, spring 4 and retainer constitute a plunger unit 80.

Figure 9:
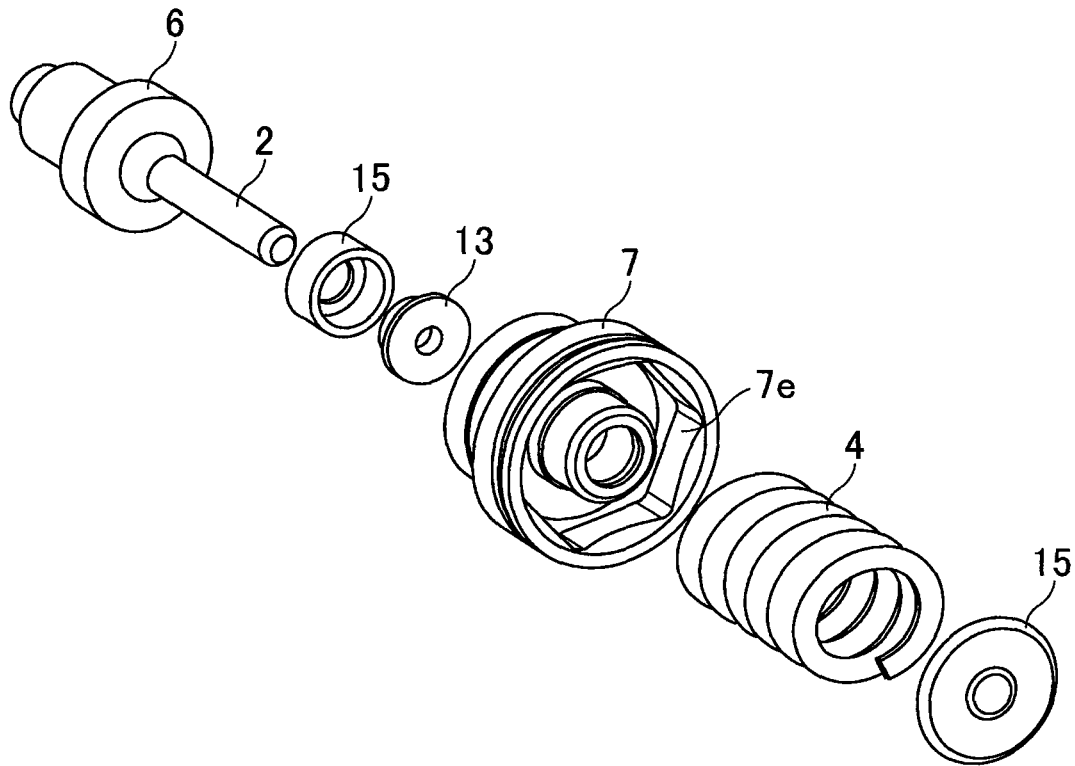
FIG. 9 is a perspective view for assistance in explaining how to assemble the piston plunger unit of the high-pressure fuel supply pump according to the first embodiment of the invention.

FIG. 9 illustrates a method of assembling the plunger unit 80.

The piston plunger 2, cylinder 6, seal holder 15, and plunger seal 13 are first assembled into the cylinder holder 7 from the upper left in the figure. In this case, the seal holder 15 is fixedly press-fitted into the inner circumferential cylindrical surface 7c of the cylinder holder 7 as described above. Thereafter, the spring 4 and retainer 15 are assembled into the cylinder holder 7 from the lower right in the figure. In this case, the retainer 15 is fixedly press-fitted into the piston plunger 2.

The O-ring 61 and an O-ring 62 are attached to the plunger unit 80, which is thereafter fixedly fastened to the pump housing 1 by means of the screws as described above. The fastening is performed by use of a hexagonal portion 7e formed on the cylinder holder 7. The hexagonal portion 7e is formed internally-hexagonal. A screw is fastened by torque generated by use of a specialized tool. By controlling the torque, a surface pressure between the pressure fit portion 6a and the pressure fit surface 1a is controlled.

The metal diaphragm damper 9 is composed of two metal diaphragms. The metal diaphragms are secured to each other at the full outer circumference by welding their weld portions in the state where gas is sealed in a space between the metal diaphragms. The metal diaphragm dumper 9 has a mechanism as below. If low-pressure pulsations are applied to both the surfaces of the dumper 9, the dumper 9 varies in capacity to thereby reduce the low-pressure pulsations.

The high-pressure fuel supply pump is secured to the engine by means of a flange 41, setscrews 42 and bushes 43. The flange 41 is full-circumferentially welded and joined to the pump housing 1 at a weld portion 41a. The present embodiment uses laser welding.

Figure 10:
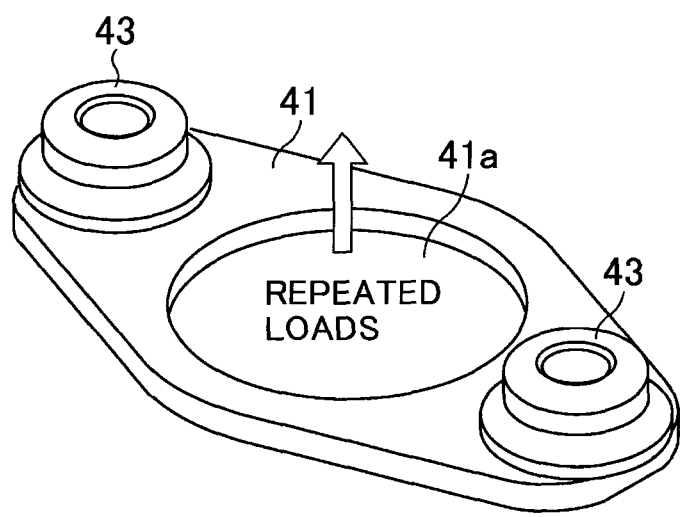
FIG. 10 is a perspective view of a flange and bushes of the high-pressure fuel supply pump according to the first embodiment of the present invention, with the other component parts omitted.

FIG. 10 is a perspective view of the flange 41 and bushes 43. This figure illustrates only the flange 41 and the bushes 43 and omits the others.

The two bushes 43 are attached to the flange 41 from the side opposite the engine. The two setscrews 42 are screwed to respective threads formed on the engine side. The high-pressure fuel supply pump is secured to the engine by pressing the two bushes 43 and flange 41 to the engine.

Figure 11:
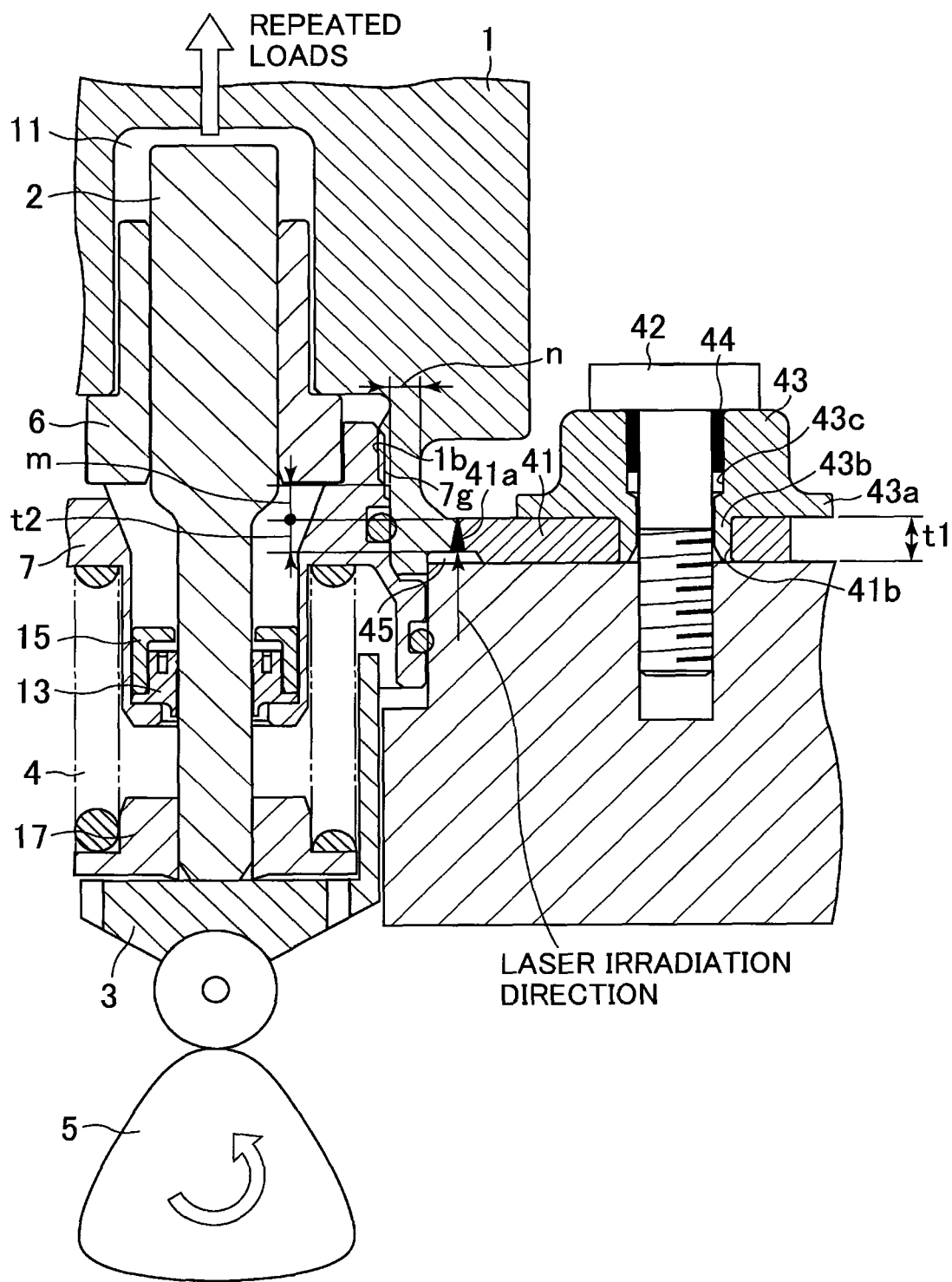
FIG. 11 is an enlarged view illustrating the vicinity of a weld portion between an attachment flange and a pump body in the high-pressure fuel supply pump according to the first embodiment of the invention.

FIG. 11 is an enlarged view illustrating a portion associated with the flange 41, setscrew 42 and bush 43.

The bush 43 has a flange portion 43a and a caulking portion 43b. First, the caulking portion 43b is caulked and fitted into an attachment hole of the flange 41. Then, the flange 41 is welded and joined to the pump housing 1 at a weld portion 41a by laser welding. Thereafter, a resin fastener 44 is inserted into the bush 43 and further the setscrew 42 is inserted into the fastener 44. The fastener 44 plays a role of temporarily fixing the setscrew 42 to the bush 43. In other words, before the high-pressure fuel supply pump is mounted to the engine, the fastener 44 fixes the setscrew 42 to prevent it from falling off from the bush 43. When the high-pressure fuel supply pump is secured to the engine, the setscrew 42 is fixedly screwed to the thread portion provided on the engine side. In this case, the setscrew 42 can be turned in the bush 43 by the fastening torque of the setscrew 42.

If the high-pressure fuel supply pump repeats high-pressure discharge, the pressurizing chamber 11 repeatedly undergoes high pressure and low pressure therein as described above. When the pressurizing chamber 11 has high pressure therein, the pump housing 1 undergoes the force resulting from the high pressure so as to be lifted upward in the figures. On the other hand, when the pressurizing chamber 11 has low pressure therein, the pump housing 1 does not undergo such a force. Because of this, the pump housing 1 will undergo repeated loading upward in the figures.

As illustrated in FIG. 10, the flange 41 serves to secure the pump housing 1 to the engine by means of the two setscrews 42. Consequently, when the pump housing 1 is lifted upward as described above, the flange 41 undergoes repeated bending loads at the central portion with portions corresponding to the two setscrews 42 and to the bushes 43 secured. The repeated bending loads deform the flange 41 and the pump housing 1 to cause repeated stress therein, which leads to a problem of fatigue breakdown. Further, also the cylinder holder 7 and the cylinder 6 are deformed; therefore, also the sliding portion of the cylinder 6 is deformed so that the seizure and fixation between the piston plunger 2 and the cylinder 6 occur as described above.

The flange 41 is manufactured by press forming for the reason of productivity. This limits the thickness t1 of the flange 41; t1=4 mm in the embodiment. A weld portion 41a or a joined portion between pump housing 1 and the flange 42 is joined together by laser welding. The laser welding needs a laser beam emitted from the downside in FIG. 11. It is impossible to emit a laser beam from the upside to the full circumference because other component parts are present thereabove. Further, the laser welding has to penetrate the flange 41 with a thickness t1 of 4 mm. If the laser welding does not penetrate the flange 41, the end face of the weld portion becomes notched. The stress resulting from the repeated loads mentioned above concentrates in the notched portion, which leads to fatigue breakdown.

To penetration-weld the flange 41 by laser welding, it is needed only to increase the output power of laser. However, welding inevitably generates heat, which thermally deforms the flange 41. In addition, during welding spatters occur in large amounts and adhere to the pump housing 1 and other component parts. In view of the foregoing, the short length of penetration-welding by laser welding is preferable.

Therefore, only the weld portion 41a is made to have a thickness t2 of 3 mm in the present embodiment. This makes it possible to penetration-weld the flange 41 by laser welding, whereby occurring spatters can be minimized. In addition, a portion with a thickness t2 of 3 mm can be formed by press forming, which yields high productivity.

A stepped portion between the portion with a thickness t2 of 3 mm in the weld portion 41a and the portion with a thickness t1 of 4 mm in the flange 41 is provided on the engine side. Thus, a void 45 is formed. The upper end face and lower end face of the weld portion 41a inevitably protrude from a base material. The provision of the void 45 can prevent the protrusion and the engine from interfering with each other. If the protrusion and the engine are in contact with each other, when the high-pressure fuel supply pump is secured to the engine by means of the setscrews 42, the flange 41 causes bending stress, leading to breakage.

Due to the provision of the void 45, the flange 41 can be prevented from breakage that would otherwise be caused by the repeated loads resulting from the high-pressure discharge, or from breakage that would otherwise be caused by contact between the protrusion of the weld portion 41a and the engine.

As described above, if the pump housing 1 undergoes repeated loads, the flange 41 is bent in the direction of the repeated loads with the portions corresponding to the two setscrews 42 and to the bushes 43 secured. Since the weld portion 41a is penetration-welded along the full circumference by laser welding, the bending of the flange 41 affects the pump housing 1. On the other hand, the cylinder holder 7 and the pump housing 1 are in contact with each other at portions corresponding to the screw 7g and to the thread 1b. The thread 1b of the pump housing 1 and the weld portion 41a are located at respective positions spaced a distance m away from each other. The pump housing 1 has a minimum thickness of n at a position corresponding to the distance m from the weld portion 41a. The values of m and n are selected so that even if the pump housing 1 is deformed by the bending of the flange 41, the portions corresponding to the distance m and thickness n accommodate the deformation so as not to affect up to the thread 1b.

This can prevent the deformation of the cylinder 6 due to the bending of the flange 41. However, the pump housing 1 must accommodate all the bending of the flange 41. In the event that the repeated stress caused in the pump housing 1 exceeds an allowable value, the pump housing 1 is subjected to fatigue breakdown, leading to fuel leakage trouble.

There are two methods as below to prevent the fatigue breakdown of the pump housing 1 as mentioned above.

(1) To make the stress thus generated below a allowable value by the shaping effect of the pump housing 1.

(2) To reduce the bending occurring in the flange 41.

A description is below given of the two methods.

Figure 12:
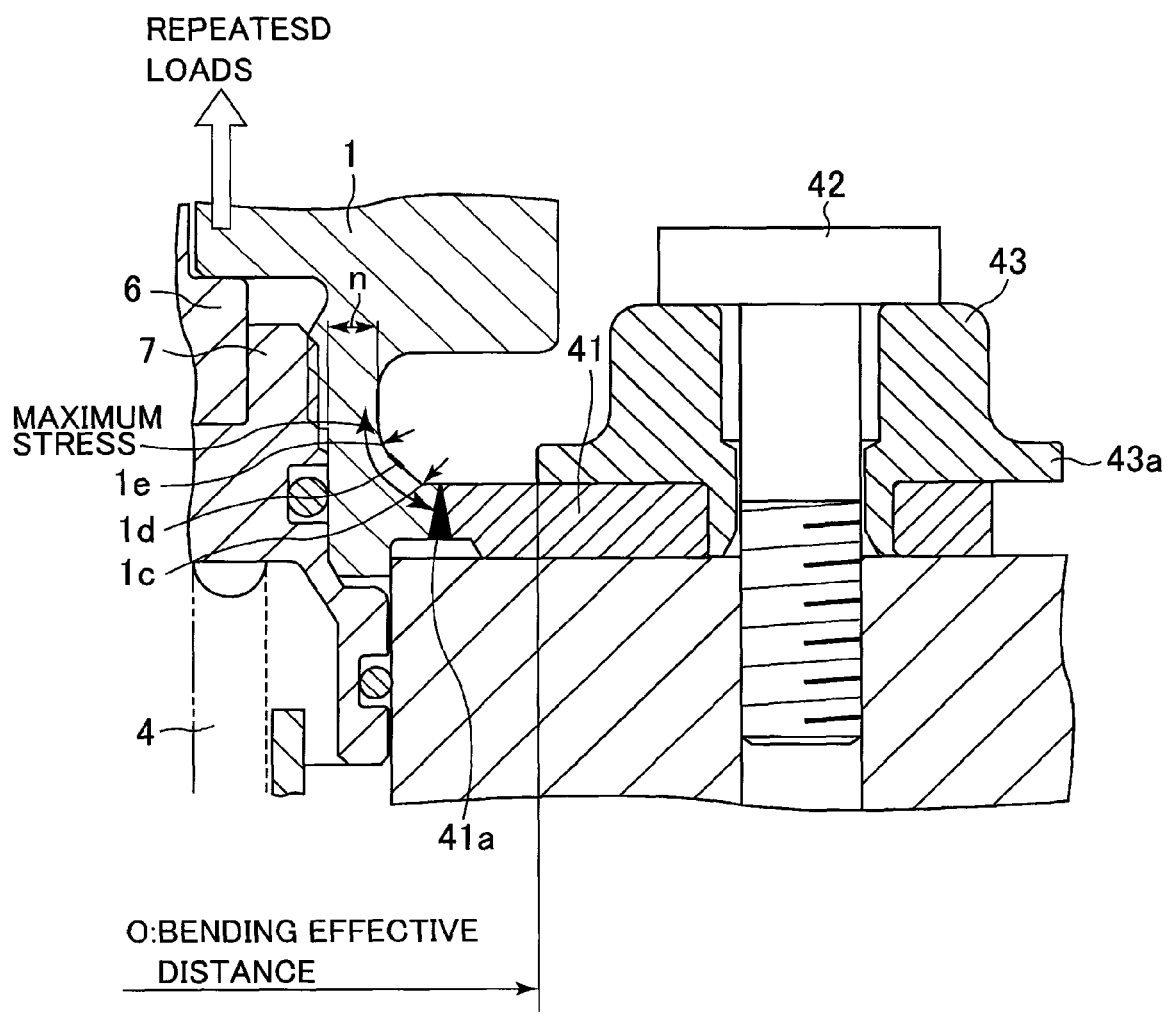
FIG. 12 is an enlarged view, further increased in size compared with in FIG. 11, illustrating the vicinity of a weld portion between the attachment flange and the pump body in the high-pressure fuel supply pump according to the first embodiment of the invention.

The method (1) is first described. FIG. 12 is an enlarged view illustrating the vicinity of the weld portion 41a. The pump housing 1 is pulled upward in the figure by the repeated load to bend the flange 41, causing stress. Its maximum stress occurs in the front surface of the pump housing 1 in arrow directions as depicted as "maximum stress" in FIG. 12. It is needed only to shape the pump housing 1 so that the occurring stress may be dispersed as much as possible by the shaping effect so as not to cause stress concentration.

In the present embodiment, a region of the pump housing 1 close to the weld portion 41a is configured to have an R-portion 1c, an R-portion 1e and a straight portion 1d connecting the R-portions 1c and 1e as shown in FIG. 12. In addition, the R-portions 1c, 1e and the straight portion 1d are designed to have respective optimum values. The straight portion 1d lies between the two R-portions 1c and 1e and stress occurring on the straight portion 1d is distributed uniformly. As a result, stress concentration does not occur so that the maximum value of the occurring stress can be reduced.

A description is next given of the method (2). There is only a method to increase the rigidity of the flange 41 in order to reduce the bending of the flange 41. However, it is very difficult for the flange 41 to have a thickness t of 4 mm or more in view of productivity as described above. For this reason, the diameter of the bush 43 that is provided only to secure the setscrew 42 is increased. A bending effective distance O indicates a shortest distance between the ends of the two bushes 43. A portion between the ends of the two bushes 43 is substantially bent by the repeated loads. If the bending effective distance O can be reduced, the rigidity of the flange 41 can consequently be enhanced.

In the present embodiment, the flange portion 43a is provided on the bush 43 in order to reduce the bending effective distance O. The bush 43 needs such a height as to receive the fastener 44 inserted therethrough. If the height increases the external shape of the bush 43, there are problems of interference with the pump housing 1, of the increase of the material of the bush 43, etc. The provision of the flange portion 43a can prevent such problems and reduce the bending effective distance O.

The configurations as described above can achieve the methods (1) and (2) and make the repeated stress occurring in the pump housing 1 lower than the allowable value of fatigue breakdown.

The problem that has solved by the present embodiment and the modes for solving the problem are summarized as below. The parenthetic reference numerals denote those used in the known example.

In the conventional electromagnetically-driven valve mechanism described in JP-8-105566-A, the valve seat (52) member and the bearing member (bearing 98) of the movable plunger (valve stem 92) attached with the valve member (94) at the distal end are composed of separate members, which are integrally assembled as a unit.

With such a configuration, however, the degree of adhesion between the valve seat member and the valve member is insufficient to cause the leakage of fluid. This poses a problem in that accurate flow control cannot be exercised.

The present embodiment can reduce the leakage of fluid from the seat portion of the electromagnetically-driven valve mechanism used in e.g. the variable capacity control mechanism of the high-pressure fuel supply pump.

In the present embodiment, the valve seat member and the valve member are configured as a single member machined from one and the same member.

With such a configuration, the gap between the movable plunger and the bearing can be made smaller than ever before. Consequently, the inclination of the movable plunger can be suppressed, sealing performance between the valve seat member and the valve member can be enhanced and thus fluid control accuracy can be improved.

Specific modes for carrying out the invention are as below.

[Mode 1]

An electromagnetically-driven valve mechanism including:

an externally-open type valve member disposed at a fluid inlet port;

a movable plunger operated by an electromagnetic force;

a restricting member restricting the displacement of the plunger at a specific position;

a spring member biasing the movable plunger on the side opposite the restricting member;

an electromagnetic drive mechanism for electromagnetically biasing the movable plunger to bias the valve member and the movable plunger in the direction of closing the fluid inlet port;

a valve seat with and from which the valve member comes into close contact and moves away; and a bearing member supporting the movable plunger in a reciprocatable manner;

wherein the valve seat and the bearing member are made of one and the same member and machined as a single piece.

[Mode 2]

In the electrically-driven valve mechanism recited in mode 1, an anchor is secured to an end of the movable plunger on the side opposite the valve member, the anchor is disposed to face the restricting member through a magnetic gap, the restricting member constitutes a magnetic core portion of the electromagnetic drive mechanism, a cap member made of a magnetic material is secured to the magnetic core portion of the restricting member to surround the anchor and the magnetic gap and seal the inside thereof, an electromagnetic coil is attached to the outer circumference of the cap member, and a yoke portion is disposed on the outer circumference of the electromagnetic coil to form a magnetic path in cooperation with the anchor, the magnetic gap, the magnetic core portion and the cap member.

[Mode 3]

In the electrically-driven valve mechanism recited in mode 1, the electromagnetic drive mechanism has a body portion made of a magnetic material, and the bearing member is fixedly press fitted into the inner circumferential wall of the internal through-hole formed in the body portion of the electromagnetic drive mechanism.

[Mode 4]

In the electrically-driven valve mechanism recited in mode 1, an anchor is secured to an end of the movable plunger on the side opposite the valve member, the anchor is disposed to face the restricting member through a magnetic gap, the restricting member constitutes a magnetic core portion of the electromagnetic drive mechanism, a cap member made of a magnetic material is secured to a magnetic core portion of the restricting member to surround the anchor and the magnetic gap and seal the inside thereof, an electromagnetic coil is attached to the outer circumference of the cap member, a yoke portion is disposed on the outer circumference of the electromagnetic coil so as to form a magnetic path in cooperation with the anchor, the magnetic gap, the magnetic core portion and the cap member, the magnetic drive mechanism has a body portion made of a magnetic material, and the bearing member is fixedly press fitted into the inner circumferential wall of an inner through-hole formed in the body portion of the electromagnetic drive mechanism.

[Mode 5]

In the electrically-driven valve mechanism recited in mode 2 or 4, a coil spring as the spring member is installed between the inner circumferential portion of the anchor and the outer circumference of the movable plunger.

[Mode 6]

In the electrically-driven valve mechanism recited in mode 2, 4 or 5, in a state where the anchor is attached, the movable plunger and the valve member formed integrally with each other have an axial gravity center disposed at a position closer to the anchor than to an axially central portion of the bearing member.

[Mode 7]

In the electrically-driven valve mechanism recited in mode 2 or 4, the electrically-driven valve mechanism includes a resin molded body portion surrounding at least part of the outer circumference of the yoke portion, and a connector is formed integrally with the resin molded body portion and a joined portion between a terminal of the connector and a terminal of the electromagnetic coil is formed externally of the yoke portion.

[Mode 8]

In the electrically-driven valve mechanism recited in mode 1, force other than the electromagnetic force is designed to assist the movement of the movable plunger in the same direction as the movement of the movable plunger by the electromagnetic force, and after the movable plunger has been moved at a specific displacement in a direction of the restricting member by the force other than the magnetic force, the electromagnetic force is applied to the movable plunger.

[Mode 9]

In the electrically-driven valve mechanism recited in mode 1, after the valve member has initially operatively been opened against the force of the spring member due to a fluid differential pressure between the upstream side and downstream side of the valve member, the electromagnetic drive mechanism biases the movable plunger in a direction of maintaining or assisting the opening operation of the valve member.

[Mode 10]

A high-pressure fuel supply pump having an intake valve partially composed of the electromagnetically-driven valve mechanism recited in any one of modes 1 to 7.

[Mode 11]

In the high-pressure fuel supply pump recited in mode 10, in a state where the electromagnetic drive mechanism is not energized and the fluid differential pressure is reduced to zero, the intake valve member is closed by the spring member.

[Mode 12]

In the high-pressure fuel supply pump recited in mode 10, the intake valve member is operatively opened or is maintained in an opened state by applying input voltage to the electromagnetic drive mechanism in an intake process of the piston plunger constituting part of the high-pressure fuel supply pump.

[Mode 13]

In the high-pressure fuel supply pump recited in mode 10, 11 or 12, after the intake valve member has operatively been opened against a biasing force of the spring member due to a fluid differential pressure between an intake passage side and a pressurizing chamber side of the intake valve member, the opening operation of the intake valve member is maintained or assisted by applying input voltage to the electromagnetic drive mechanism.

[Mode 14]

In the high-pressure fuel supply pump recited in mode 10, after the opening state of the valve member has been maintained with input voltage remaining applied to the electromagnetic drive mechanism, the input voltage is turned off in a compression process of the piston plunger to turn off an electric current flowing to the electromagnetic drive mechanism.

[Mode 15]

In the high-pressure fuel supply pump recited in mode 10, timing to turn off the input voltage applied to the electromagnetic drive mechanism is controlled according to movement of the piston plunger to control a flow rate of fuel discharged at high pressure.

[Mode 16]

In the high-pressure fuel supply pump recited in mode 10, a value of electric current occurring in the electromagnetic drive mechanism is controlled by varying input voltage.

[Mode 17]

In the high-pressure fuel supply pump recited in mode 10, during a time period from application of input voltage to the electromagnetic drive mechanism to release of the application, the application of the input voltage and the release of the application are periodically repeated in further shorter periods.

[Mode 18]

In the high-pressure fuel supply pump recited in mode 10, the electromagnetic intake valve is assembled as a unit.

The electromagnetically-driven valve mechanism itself according to the present invention can be used to control fluid including fuel. Also in the case where it is used in the high-pressure fuel pump, not only it is used for the intake valve mechanism as in the embodiment but also it can be used as a spill valve installed in a spill passage in addition to the intake valve.

What is claimed is:

1. An electromagnetically-driven valve mechanism comprising:

a valve member disposed at a fluid inlet port;
a movable plunger operated by an electromagnetic force;
a spring member biasing the movable plunger in a direction opposite the electromagnetic force; and
an electromagnetic drive mechanism for operating the valve member through the movable plunger against the spring member by electromagnetically biasing the movable plunger to open and close the fluid inlet port;
the electromagnetic drive mechanism including
a core portion adapted to receive the movable plunger inserted therethrough,
an annular or cylindrical electromagnetic coil portion attached around the core portion,
a cylindrical yoke portion surrounding the outside of the electromagnetic coil portion,
a resin-molded body composed of the electromagnetic coil portion and the yoke portion,
a connector portion formed integrally with the resin-molded body so as to be used for connection with external equipment, and
an external connection terminal made of a conductor and mounted to the connector portion;
wherein a welded portion that connects an end of a lead line forming the electromagnetic coil portion and one end of the external connection terminal is disposed externally of the yoke portion;
the core portion is mounted in a cylindrical space defined by an inner circumferential surface of the resin-molded body;
the resin-molded body is fixedly press-fitted into an outer circumference of the core portion at an open end of the yoke portion; and
an inner diameter of a section of the inner circumferential surface of the resin-molded body that contacts the core portion at a bottom wall of the yoke portion is a smallest inner diameter of the inner circumferential surface of the resin-molded body.

2. The electromagnetically-driven valve mechanism according to claim 1, wherein the electromagnetic drive mechanism is attached with the core portion in a bottomed cylindrical space defined between an inner circumferential surface of the electromagnetic coil portion and part of an inner circumferential surface of the resin-molded body.

3. The electromagnetically-driven valve mechanism according to claim 2, wherein a minute gap is defined between an outer circumferential surface of the core portion and then inner circumferential surface of the resin-molded body.

4. The electromagnetically-driven valve mechanism according to claim 1, wherein the electromagnetic coil portion includes
an annular or cylindrical resin bobbin and
the lead line wound around the bobbin, wherein the one end of the external connection terminal is mechanically attached to an axial end of the bobbin.

5. The electromagnetically-driven valve mechanism according to claim 1,
wherein the core portion is composed of a first core portion made of a magnetic material and a second core portion made of a magnetic material,
the second core portion is formed like a cap and formed with an annular groove on an outer circumference of the second core portion at a specific axial position,
an open end of the second core portion is full-circumferentially welded to one end of the first core portion,
an anchor is secured to an end of the movable plunger,
a magnetic gap is defined between respective axial opposite surfaces of the anchor and the first core, and
the annular groove is formed around the magnetic gap.

6. The electromagnetically-driven valve mechanism according to claim 5,
wherein the first core portion is provided with a restricting portion adapted to restrict an axial displacement of the anchor at a specific position,
the spring member is attached between the anchor and the first core portion so as to bias the anchor toward a side opposite the restricting member,
during energization, the electromagnetic drive mechanism attracts the anchor toward the first core in a direction opposite the biasing force of the spring member,
the valve member is disposed as an externally open valve on a side of the movable plunger opposite the anchor,
an auxiliary member including a valve seat portion and a bearing member and being made of one and the same member is provided, the valve seat portion being abutted against the valve member to block a fluid passage, the bearing member supporting the movable plunger in a reciprocatable manner, and
the auxiliary member is secured to a side of the first core portion opposite the second core portion.

7. The electromagnetically-driven valve mechanism according to claim 5,
wherein an electromagnetic coil is disposed on an external circumference of the first core portion and of the second core portion,
the yoke portion is disposed on an outer circumference of the electromagnetic coil, and
the first core portion, the magnetic gap, the anchor, the second core portion and the yoke portion form a closed magnetic path in cooperation with one another.

8. The electromagnetically-driven valve mechanism according to claim 6,
wherein the spring member is composed of a coil spring and attached to an outer circumference of the movable plunger.

9. The electromagnetically-driven valve mechanism according to claim 5,
wherein in a state where the anchor is attached, the movable plunger and the valve member formed integrally with each other have an axial gravity center disposed at a position closer to the anchor than to an axially central portion of a bearing member.

10. The electromagnetically-driven valve mechanism according to claim 5,
wherein force other than the electromagnetic force is designed to assist the electromagnetic force against the spring member, and
after the movable plunger has been displaced in a direction of a restricting member by the force other than the magnetic force, the electromagnetic force is applied to the movable plunger.

11. The electromagnetically-driven valve mechanism according to claim 5,
wherein after the valve member has initially operatively been opened against the force of the spring member due to a fluid differential pressure between an upstream side and a downstream side of the valve member, the electromagnetic drive mechanism biases the movable plunger in a direction of maintaining or assisting opening operation of the valve member.

12. A high-pressure fuel supply pump comprising:
a pressurizing chamber whose capacity is varied by reciprocation of a piston plunger; and
an intake valve mechanism composed of the electromagnetically-driven valve mechanism described in claim 1 and disposed at an inlet of the pressurizing chamber;
wherein fuel is sucked from the intake valve mechanism when the capacity of the pressurizing chamber is increased and pressurized fuel is discharged from a discharge port when the capacity of the pressurizing chamber is reduced.

13. The high-pressure fuel supply pump according to claim 12,
wherein in a state where the electromagnetic drive mechanism is not energized and the fluid differential pressure is reduced to zero, the intake valve member is closed by the spring member.

14. The high-pressure fuel supply pump according to claim 12,
wherein the intake valve member is operatively opened or is maintained in an opened state by applying input voltage to the electromagnetic drive mechanism in an intake process of the piston plunger.

15. The high-pressure fuel supply pump according to claim 12,
wherein after the intake valve member has operatively been opened against a biasing force of the spring member due to a fluid differential pressure between an intake passage side and a pressurizing chamber side of the intake valve member, the opening operation of the intake valve member is maintained or assisted by applying input voltage to the electromagnetic drive mechanism.

16. The high-pressure fuel supply pump according to claim 12,
wherein after the opening state of the valve member has been maintained with input voltage remaining applied to the electromagnetic drive mechanism, the input voltage is turned off in a compression process of the piston plunger to turn off an electric current flowing to the electromagnetic drive mechanism.

17. The high-pressure fuel supply pump according to claim 16,
wherein timing to turn off the input voltage applied to the electromagnetic drive mechanism is controlled according to movement of the piston plunger to control a flow rate of fuel discharged at high pressure.

18. The high-pressure fuel supply pump according to claim 12,
wherein a value of electric current flowing to the electromagnetic drive mechanism is controlled according to voltage applied to the electromagnetic drive mechanism.

19. The high-pressure fuel supply pump according to claim 12, wherein an application of the input voltage to the electromagnetic drive mechanism and a release of the application are periodically repeated.

20. The high-pressure fuel supply pump according to claim 12,
wherein the electromagnetic drive mechanism is unitized into a single component as an electromagnetic drive mechanism unit and the electromagnetic drive mechanism unit is assembled to a pump body.

21. An electromagnetically-driven valve mechanism comprising:
a valve member disposed at a fluid inlet port;
a movable plunger operated by an electromagnetic force;
a spring member biasing the movable plunger in a direction opposite the electromagnetic force; and
an electromagnetic drive mechanism for operating the valve member through the movable plunger against the spring member by electromagnetically biasing the movable plunger to open and close the fluid inlet port;
the electromagnetic drive mechanism including
a core portion adapted to receive the movable plunger inserted therethrough,
an annular or cylindrical electromagnetic coil portion attached around the core portion,
a cylindrical yoke portion surrounding the outside of the electromagnetic coil portion,
a resin-molded body composed of the electromagnetic coil portion and the yoke portion,
a connector portion formed integrally with the resin-molded body so as to be used for connection with external equipment, and
an external connection terminal made of a conductor and mounted to the connector portion;
wherein a means for connecting an end of a lead line forming the electromagnetic coil portion and one end of the external connection terminal is disposed externally of the yoke portion;
the core portion is mounted in a cylindrical space defined by an inner circumferential surface of the resin-molded body;
the resin-molded body is fixedly press-fitted into an outer circumference of the core portion at an open end of the yoke portion; and
an inner diameter of a section of the inner circumferential surface of the resin-molded body that contacts the core portion at a bottom wall of the yoke portion is a smallest inner diameter of the inner circumferential surface of the resin-molded body.

* * * * *